United States Patent [19]
Matsushita et al.

[11] Patent Number: 6,095,116
[45] Date of Patent: *Aug. 1, 2000

[54] APPARATUS FOR CONTROLLING NEGATIVE PRESSURE IN INTERNAL COMBUSTION ENGINE

[75] Inventors: Souichi Matsushita, Nishikamo-gun; Mitsuru Takada, Aichi-gun; Yukio Yoshioka; Jun Harada, both of Toyota, all of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,202

[22] Filed: Jun. 24, 1997

[30] Foreign Application Priority Data

Sep. 30, 1996 [JP] Japan ..................................... 8-259620
Jan. 23, 1997 [JP] Japan ..................................... 9-010635

[51] Int. Cl.⁷ ............................. B60T 13/52; F02D 41/12
[52] U.S. Cl. ......................... 123/350; 123/295; 123/399; 477/205; 477/206; 303/114.3
[58] Field of Search ..................................... 123/295, 350, 123/480, 399; 477/203, 204, 205, 206; 303/114.3, 139, 141

[56] References Cited

U.S. PATENT DOCUMENTS

| | | | |
|---|---|---|---|
| 2,876,876 | 3/1959 | Cummins | 477/205 |
| 3,947,073 | 3/1976 | Cattaneo et al. | 303/121 |
| 4,043,123 | 8/1977 | Konish et al. | 60/397 |
| 4,328,669 | 5/1982 | Mort | 60/397 |
| 4,610,483 | 9/1986 | Matsumoto et al. | 303/114.3 |
| 5,078,457 | 1/1992 | Rittmannsberger et al. | 303/113.3 |
| 5,152,587 | 10/1992 | Volz | 303/114.3 |
| 5,826,559 | 10/1998 | Ichimoto et al. | 123/295 |
| 5,846,164 | 12/1998 | Harada | 477/205 |

FOREIGN PATENT DOCUMENTS

| | | |
|---|---|---|
| 1231337 | 9/1960 | France . |
| JP-A-58-23244 | 2/1983 | Japan . |
| JP-A-61-21831 | 1/1986 | Japan . |
| JP-A-8-164840 | 6/1996 | Japan . |
| 308680 | 5/1930 | United Kingdom . |
| WO 93/11983 | 6/1993 | WIPO . |

OTHER PUBLICATIONS

Patent Abstracts of Japan, Publication No. 06050191. Feb. 22, 1994.

*Primary Examiner*—Willis R. Wolfe
*Assistant Examiner*—Hieu T. Vo
*Attorney, Agent, or Firm*—Oliff & Berridge, PLC

[57] ABSTRACT

An improved apparatus controls negative pressure in a combustion engine. The apparatus has a brake booster that is capable of increasing braking force of a vehicle by means of the negative pressure in the brake booster. A valve disposed in an air intake pressure generates the negative pressure that is supplied to the brake booster. An electric control unit controls the valve when pressure in the brake booster is in excess of a predetermined magnitude.

25 Claims, 17 Drawing Sheets

| tKPBKO-DPBK (mmHg) | 0 | 100 | 200 | 300 | 400 |
|---|---|---|---|---|---|
| a (°) | 1.0 | 1.5 | 2.0 | 2.5 | 3.5 |

Fig. 17
| TRTCBK (°) | 0 | 3 | 6 | 9 | 12 |
|---|---|---|---|---|---|
| KAINJ (°CA) | 0 | 2 | 6 | 8 | 10 |
Fig. 18
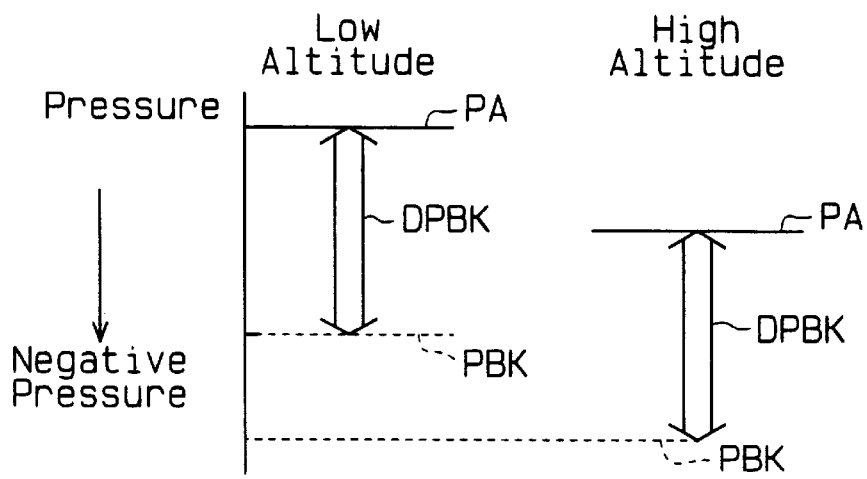
Fig. 19
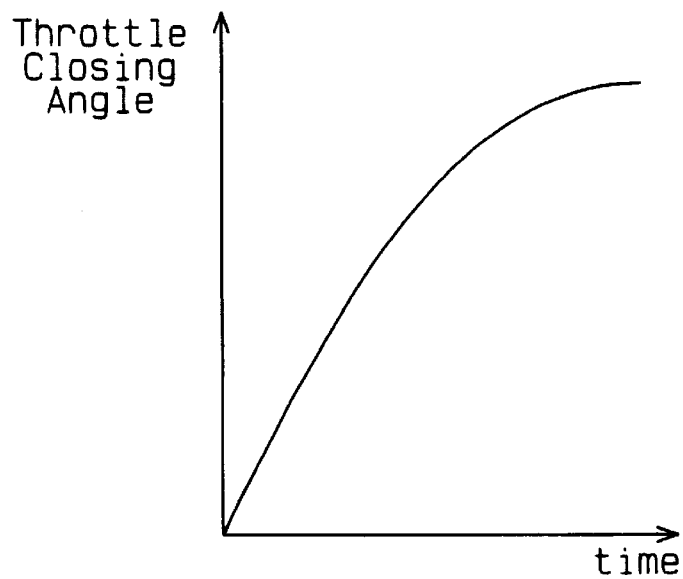

APPARATUS FOR CONTROLLING NEGATIVE PRESSURE IN INTERNAL COMBUSTION ENGINE

BACKGROUND OF THE INVENTION

1. Field of the Invention

The present invention relates to apparatuses for controlling negative pressure in internal combustion engines. More particularly, the present invention pertains to apparatuses for controlling negative pressure in internal combustion engines that are provided with brake boosters, which use negative pressure to improve braking force.

2. Description of the Related Art

Brake boosters have become widely used in vehicles to decrease the required pressing force of the brake pedal. A typical brake booster uses negative pressure, which is produced in an intake passage downstream of a throttle valve, as a drive source. In other words, negative pressure is communicated to the brake booster through a communicating pipe connected to the downstream side of the throttle valve. Negative pressure corresponding to the pressed amount of the brake pedal acts on a diaphragm, which is incorporated in the brake booster, and increases the braking force.

However, internal combustion engines such as diesel engines do not control the amount of air intake during operation. Thus, it is difficult to produce negative pressure at the downstream side of the throttle valve. In such cases, vacuum pumps are provided to produce negative pressure for the brake booster.

Japanese Unexamined Patent Publication No. 61-21831 describes an apparatus that produces negative pressure for the brake booster when the vacuum pump malfunctions. The apparatus slightly closes the throttle valve to produce negative pressure at the downstream side of the throttle valve. The negative pressure is communicated to the brake booster.

However, the employment of a vacuum pump increases the engine load and degrades the fuel efficiency.

Furthermore, in engines that perform stratified charge combustion, stoichiometric air-fuel mixture is supplied to the vicinity or an ignition plug in a cylinder. The other portions of the cylinder are provided with only air. Hence, the throttle valve is substantially completely opened during normal running conditions. As a result, practically no negative pressure is produced at the downstream side of the throttle valve. This causes the negative pressure communicated to the brake booster to be insufficient.

SUMMARY OF THE INVENTION

Accordingly, it is an objective of the present invention to provide an apparatus for communicating sufficient pressure to the brake booster without increasing the engine load in an engine that completely opens the throttle valve under normal running conditions.

To achieve the above objective, the present invention provides an apparatus for controlling negative pressure in a combustion engine. The apparatus has a brake booster capable of increasing braking force of a vehicle based on the negative pressure supplied to an interior of the brake booster. The apparatus includes a means for generating the negative pressure that is supplied to the brake booster. The apparatus also includes means for controlling the generating means. The controlling means actuates the generating means when pressure in the brake booster is in excess of a predetermined magnitude.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 17 is table (map) showing the relationship between the throttle closing angle and the fuel injection timing compensation angle;

FIG. 18 is a graph illustrating the relationship of the brake booster pressure at low and high altitudes;

FIG. 19 is a graph showing the relationship between time and the throttle closing angle;

DESCRIPTION OF THE PREFERRED EMBODIMENT

One embodiment of an apparatus for controlling negative pressure in an internal combustion engine according to the present invention will now be described with reference to the drawings.

Figure 1:
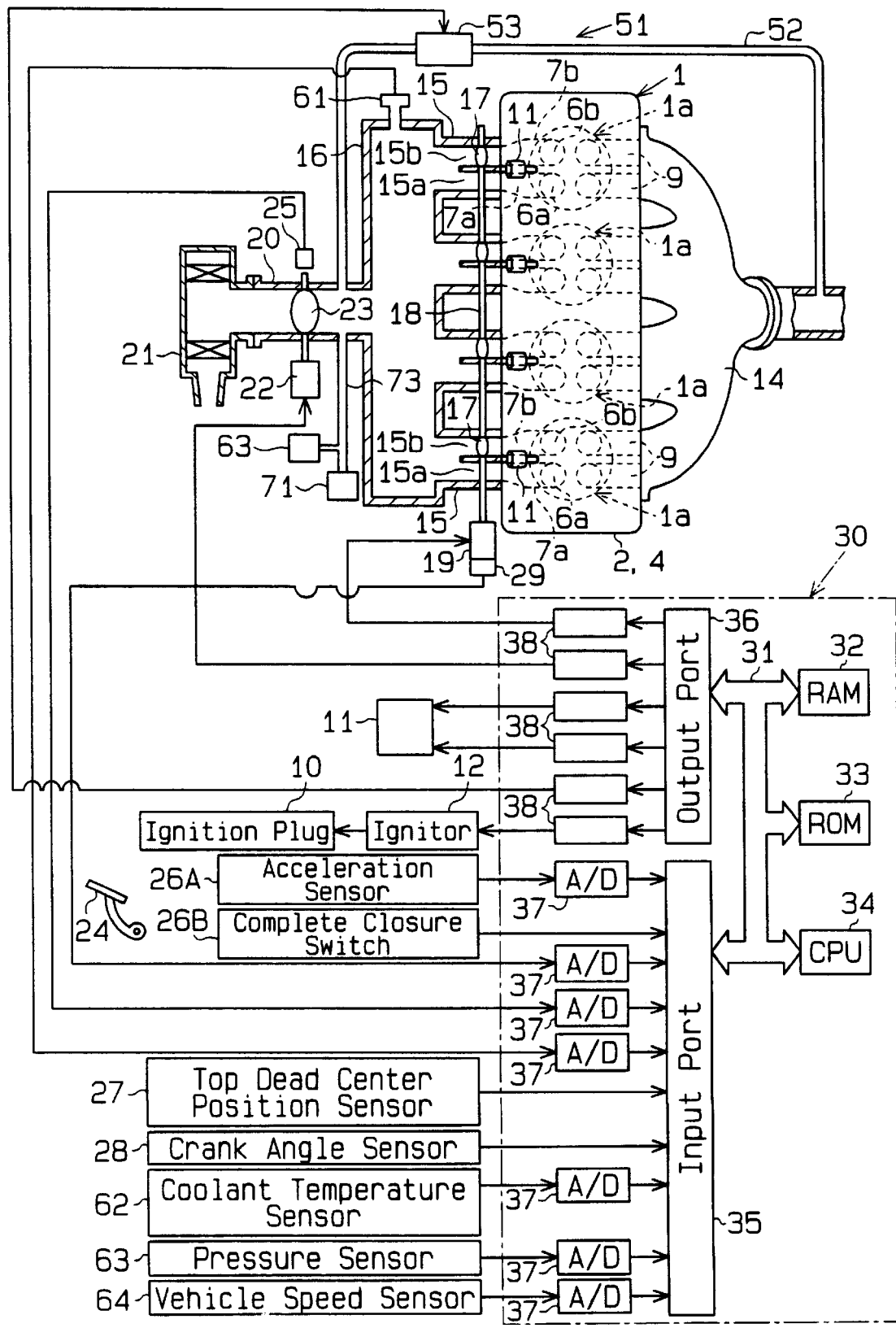
FIG. 1 is a diagrammatic drawing showing an apparatus for controlling negative pressure in an engine according to a first embodiment of the present invention.
Figure 2:
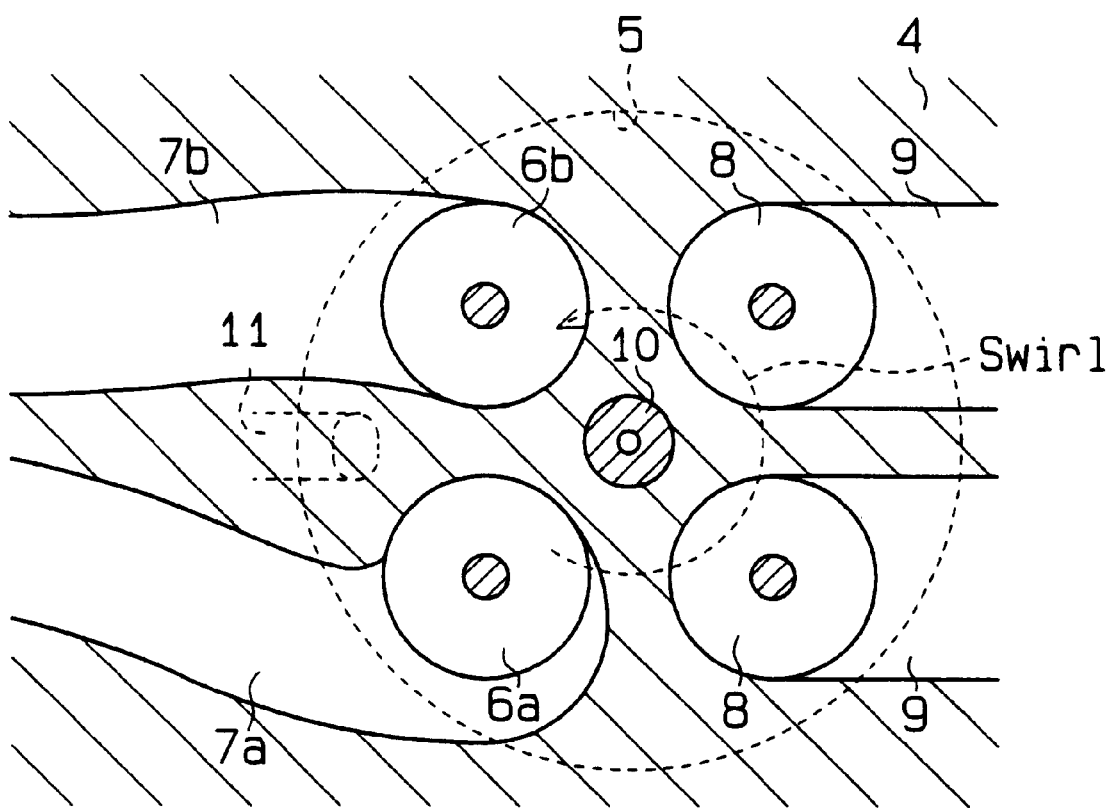
FIG. 2 is an enlarged cross-sectional view showing the engine cylinder.

As shown in FIG. 1, an engine 1 is provided with, for example, four cylinders 1a. The structure of the combustion chamber of each cylinder 1a is shown in FIG. 2. As shown in these drawings, the engine 1 has a cylinder block 2 that accommodates pistons. The pistons are reciprocated in the cylinder block 2. A cylinder head 4 is arranged on top of the cylinder block 2. A combustion chamber 5 is defined between each piston and the cylinder head 4. In this embodiment, four valves (first intake valve 6a, second intake valve 6b, and two exhaust valves 8) are provided for each cylinder 1a. The first intake valve 6a is provided with a first intake port 7a while the second intake valve 6b is provided with a second intake port 7b. Each exhaust valve 8 is provided with an exhaust port 9.

As shown in FIG. 2, the first intake port 7a is a helical port that extends in a helical manner. The second port 7b extends in a straight manner. Ignition plugs 10 are arranged at the middle of the cylinder head 4. High voltage is applied to each ignition plug 10 by an ignitor 12 though a distributor (not shown). The ignition timing of the ignition plugs 10 is determined by the output timing of the high voltage sent from the ignitor 12. A fuel injection valve 11 is arranged near the inner wall of the cylinder head at the vicinity of each set of first and second intake valves 6a, 6b. The fuel injection valve 11 is used to inject fuel directly into the associated cylinder 1a and enables both stratified charge combustion and uniform charge combustion.

As shown in FIG. 1, the first and second intake ports 7a, 7b of each cylinder 1a are connected to a surge tank 16 by a first intake passage 1a and a second intake passage 15b, which are defined in an intake manifold 15. A swirl control valve 17 is arranged in each second intake passage 15b. The swirl control valves 17 are connected to, for example, a step motor 19 by a common shaft 18. The step motor 19 In controlled by signals sent from an electronic control unit (ECU) 30. The step motor 19 may be replaced by an actuating member controlled by the negative pressure in the intake ports 7a, 7b.

The surge tank 16 is connected to an air cleaner 21 through an intake duct 20. An electrically controlled throttle valve 23, which is opened and closed by a step motor 22, is arranged in the intake duct 20. The ECU 30 sends signals to drive the step motor 22 and open and close the throttle valve 23. The throttle valve 23 adjusts the amount of intake air that passes through the intake duct 20 and enters the combustion chambers 5. The throttle valve 23 also adjusts the negative pressure produced in the intake duct 20.

A throttle sensor 25 is arranged in the vicinity of the throttle valve 23 to detect the opening angle (throttle angle TA) of the valve 23; The exhaust ports 9 of each cylinder 1a are connected to an exhaust manifold 14. After combustion, the exhaust gas is sent to an exhaust pipe (not shown) through the exhaust manifold 14.

A conventional exhaust gas recirculation (EGR) mechanism 51 recirculates some of the exhaust gas through an EGR passage 52. An EGR valve 53 is arranged in the EGR passage 52. The EGR passage 52 connects the downstream side of the throttle valve 23 in the intake duct 20 to an exhaust duct. The EGR valve 53 includes a valve seat, a valve body, and a step motor (all of which are not shown). The opening area of the EGR valve 53 is altered by causing the step. motor to intermittently displace the valve body with respect to the valve seat. When the EGR valve 53 opens, some of the exhaust gas sent into the exhaust duct enters the EGR passage 52. The gas is then drawn into the intake duct 20 via the EGR valve 53. In other words, some of the exhaust gas is recirculated by the EGR mechanism 51 and returned to the air-fuel mixture. The recirculation amount of the exhaust gas is adjusted by the opening amount of the EGR valve 53.

Figure 3:
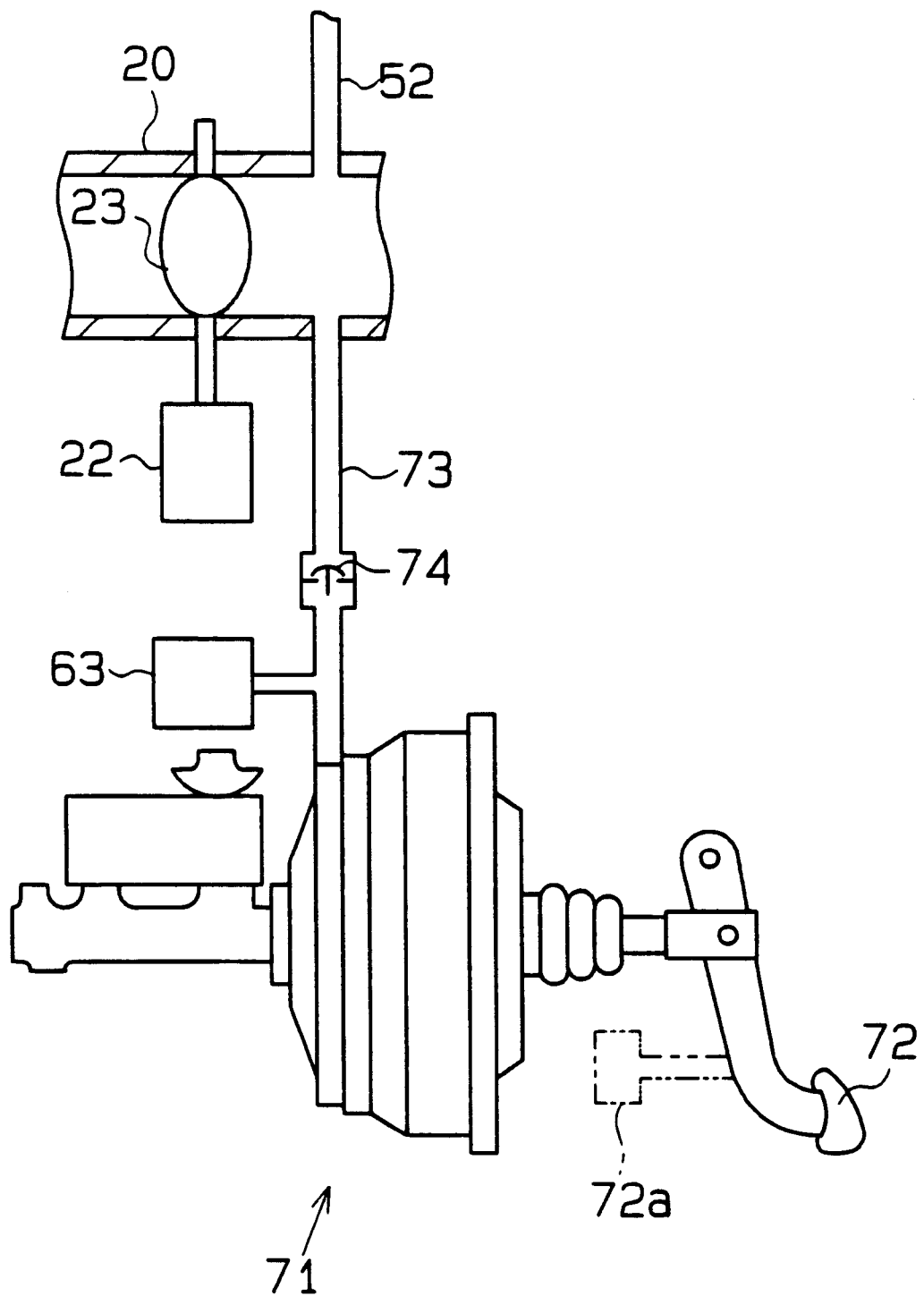
FIG. 3 is a schematic drawing showing the brake booster.

As shown in FIGS. 1 and 3, a brake booster 71 is provided to enhance the braking force of the vehicle. The brake booster 71 increases the pressing force of the brake pedal 72. The pressing force is converted to hydraulic pressure and used to actuate brake actuators (not shown) provided for each wheel. The brake booster 71 In connected is to the downstream side of the throttle valve 23 in the intake duct 20 by a connecting pipe 73 and actuated by the negative pressure produced in the duct 20. A check valve 74, which is opened by the negative pressure produced in the intake duct 20, is provided in the connecting pipe 73 (FIG. 3). The brake booster 71 includes a diaphragm, which serves as an actuating portion. One side of the diaphragm communicates with the atmosphere. The negative pressure produced in the intake duct 20 and communicated through the connecting pipe 73 act; on the other side of the diaphragm. A pressure sensor 63 is arranged in the connecting pipe 73 to detect the pressure in the brake booster 71, or the brake booster pressure PBK.

The ECU 30 is a digital computer provided with a random access memory (RAM) 32, a read only memory (ROM) 33, a central processing unit (CPU) 34, which is a microprocessor, an input port 35, and an output port 36. A bidirectional bus 31 connects the RAM 32, the ROM 33, the CPU 34, the input port 35, and the output port 36 to one another.

An acceleration pedal 24 is connected to an acceleration sensor 26A. The acceleration sensor 26A generates voltage proportional to the degree of depression of the acceleration pedal 24. This enables the degree of acceleration pedal depression ACCP to be detected. The voltage output by the acceleration sensor 26A is input into the input port 35 by way of an analog to digital (A/D) converter 37. The acceleration pedal 24 is also provided with a complete closure switch 26B, which detects whether the acceleration pedal 24 is not pressed at all. The closure switch 26B outputs a complete closure signal XIDL set at one when the acceleration pedal 24 in not pressed at all and outputs a complete closure signal XIDL set at zero when the acceleration pedal 24 is pressed. The output voltage of the closure switch 26B is also input into the input port 35.

A top dead center position sensor 27 generates an output pulse when, for example, the piston in the first cylinder 1a reaches the top dead center position. The output pulse in input into the input port 35. A crank angle sensor 28 generates an output pulse each time a crankshaft of the engine 1 is rotated by a crank angle CA of 30 degrees. The output pulse sent from the crank angle sensor 27 is input into the input port 35. The CPU 34 reads the output pulses of the top dead center position sensor 27 and the crank angle sensor 28 to compute the engine speed NE.

The rotational angle of the shaft 18 is detected by a swirl control valve sensor 29 to measure the opening area of the swirl control valves 17. The signal output of the swirl control valve sensor 29 is input into the input port 35 by way of an A/D converter 37.

The throttle sensor 25 detects the throttle angle TA. The signal output of the throttle sensor 25 is input into the input port 35 by way of an A/D converter 37.

An intake pressure sensor 61 is provided to detect the pressure in the surge tank 16 (intake pressure PiM). The intake pressure PiM detected by the intake pressure sensor 61 when the engine 1 is started is substantially equal to the atmospheric pressure PA. Thus, the intake pressure sensor 61 also detects atmospheric pressure.

A coolant temperature sensor 62 is provided to detect the temperature of the engine coolant (coolant temperature THW). A vehicle speed sensor 64 is provided to detect the speed of the vehicle (vehicle speed SPD). The signal outputs of the sensors 61, 62, 64 are input into the input port 35 by way of A/D converters 37. The signal output of the pressure sensor 63 is also input into the input port 35 by way of an A/D converter 37.

The running condition of the engine 1 is detected by the throttle sensor 25, the acceleration sensor 26A, the complete closure switch 26B, the top dead center position sensor 27, the crank angle sensor 28, the swirl control valve sensor 29, the intake pressure sensor 61, the coolant temperature sensor 62, the pressure sensor 63, and the vehicle speed sensor 64.

The output port 36 is connected to the fuel injection valves 11 the step motors 19, 22, the ignitor 12, and the ECR valve 53 (step motor) by way of drive circuits 38. The ECU 30 optimally controls the fuel injection valves 11, the step motors 19, 22, the ignitor 12 (ignition plugs 10), and the EGR valve 53 with control programs stored in the ROM 33 based on signals sent from the sensors 25–29, 61–64.

Figure 4:
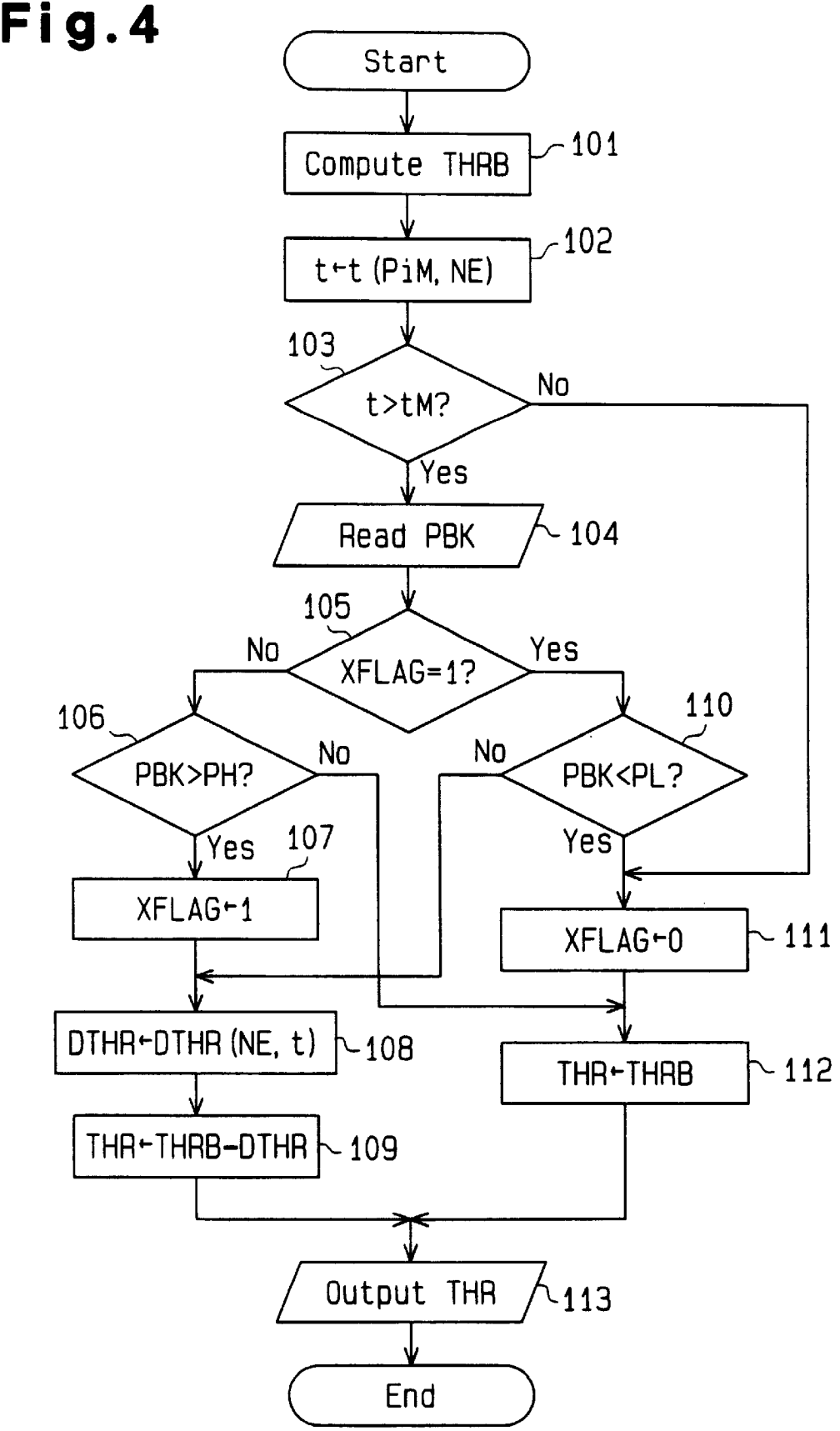
FIG. 4 is a flowchart illustrating a flowchart of a program executed by an electronic control unit (ECU) in the first embodiment.

A control program stored In the apparatus for controlling negative pressure in the engine 1 by controlling the throttle valve 23 will now be described with reference to a flowchart shown in FIG. 4.

In step 101, the ECU 30 computes the reference throttle angle THRB based on the present detecting signals (such as the degree or acceleration pedal depression ACCP and the engine speed NE) read by the ECU 30. The ECU 30 refers to a map (not shown) when obtaining the reference throttle angle THRB. In step 102, the ECU 30 computes the time period t during which the injection valve is opened based on the intake pressure PiM and the engine speed NE. In step 103, the ECU 30 determines whether the time period t is greater than a predetermined reference time period tM. The time period tM is a fixed value and indicates the time required for the throttle valve 23, which is completely opened, to close and produce negative pressure.

If it is determined that the time period t is greater than the reference time period tM in step 103, the ECU 30 determines that stable combustion is possible even if the throttle valve 23 is closed to produce negative pressure and proceeds to atop 104. At atop 104, the ECU 30 reads the pressure PBX that is applied to the brake booster 71.

In step 105, the ECU 30 determines whether the flag XFLAG, which indicates the closing of the throttle valve 23, is set at one. If the flag XFLAG is not set at one, this indicates that closing of the throttle valve 23 is not being performed. In this case, the ECU 30 proceeds to step 106 and determines whether the brake booster pressure PBX is higher than the first reference pressure PH. The first reference pressure PH is the highest negative pressure that will actuate the brake booster 71. That is, it represents the minimum level of vacuum required to actuate the booster 71.

When it is determined that the booster pressure PBX is greater than the first reference pressure PH in step 106, that is, the booster vacuum Is insufficient, the ECU 30 proceeds to step 107 and sets the flag XFLAG at one. At stop 108, the ECU 30 uses the engine speed NE and the injection valve opening time period t as a function to compute the throttle valve opening compensation angle DTHR. The compensation angle DTHR is determined from the following equation:

DTHR=DTHR(NE, t)

Figure 5:
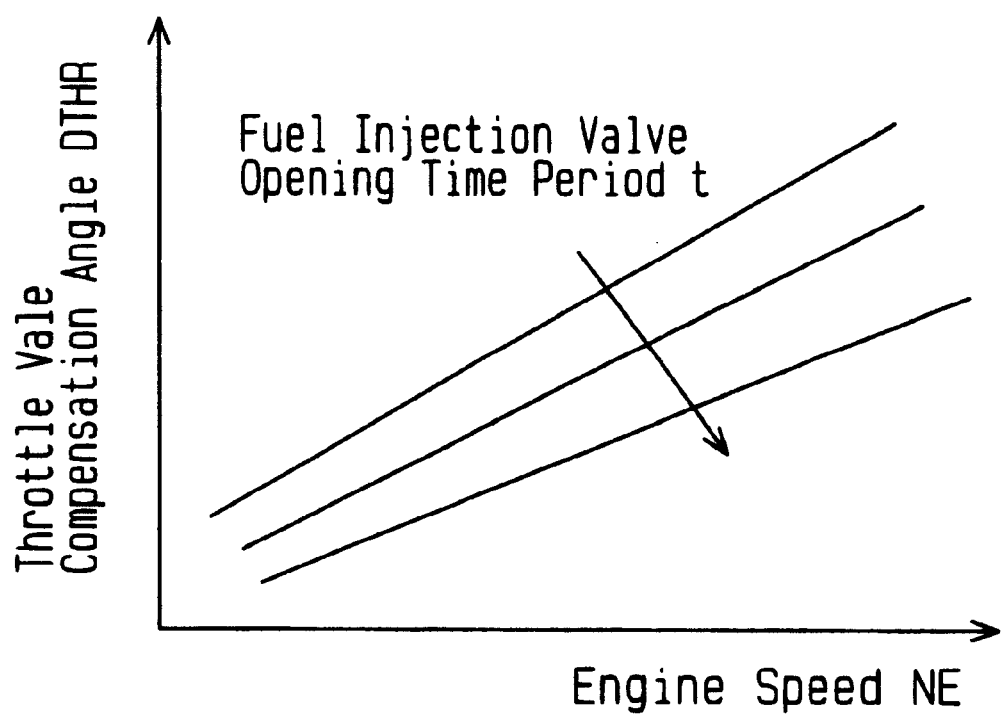
FIG. 5 shows a map for obtaining the throttle valve compensation angle of the throttle valve in the program of FIG. 4.

FIG. 5 shows a map for determining the throttle valve opening compensation angle DTHR. The horizontal axis represents the engine speed NE while the vertical axis represents the compensation angle DTHR. The parameters obtained indicate the injection valve opening time period t.

In step 109, the ECU 30 computes the command value THR related to the throttle valve opening angle by subtracting the compensation angle DTHR from the reference throttle angle THRB.

When it is determined that the closing of the throttle valve has been carried out in step 105, the ECU 30 proceeds to stop 110 and determines whether the brake booster pressure PBX is lower than the second reference pressure PL. The second reference pressure PL corresponds to the pressure value at which the negative pressure in the brake booster 71 is satisfactory. Thus, closing the throttle valve 23 is no longer necessary when the second reference pressure PL is reached. The second reference pressure PL is lower than the first reference pressure PH.

When it is been determined that the brake booster pressure PBK is lower than the second reference pressure PL in step 110, the ECU 30 proceeds to stop 111 and resets the flag XFLAG at zero. In step 112, the ECU 30 sets the reference throttle angle THRB as the throttle valve angle command value THR.

When it has been determined that the negative pressure is sufficient for actuating the brake booster 72 (i.e., the ECU 30 determines that it is not necessary to close the throttle valve 23) in step 106, the ECU 30 proceeds to step 112.

If it is determined that the negative pressure in the brake booster 71 is insufficient for actuating the booster 71, the ECU 30 proceeds to step 108 and closes the throttle valve 23. From either step 109 or step 112, the ECU 30 proceeds to step 113 and outputs the throttle valve angle command value THR. The ECU 30 then terminates the routine.

In this embodiment, the negative pressure control apparatus forcibly closes the throttle valve and produces negative pressure regardless of the running state of the vehicle when the negative pressure that acts on the brake booster 71 is insufficient. However, the closing of the throttle valve 23 decreases the amount of the air intake supplied to the engine 1. This effects the combustion of the air-fuel mixture. Thus, it is undesirable that the throttle valve 23 be closed, so it should be done as little as possible. The second embodiment copes with this requirement.

In a second embodiment according to the present invention, a brake switch 72a is added to the mechanical structure of the first embodiment. When the brake pedal 24 is pressed, the brake switch 72a outputs an ON signal. This causes the ECU 30 to set the brake actuation flag XBRG in the RAM 32. When the brake pedal 24 is released, the brake switch 72a outputs an OFF signal. This causes the ECU 30 to reset the brake actuation flag XBRG in the RAM 32.

Figure 6:
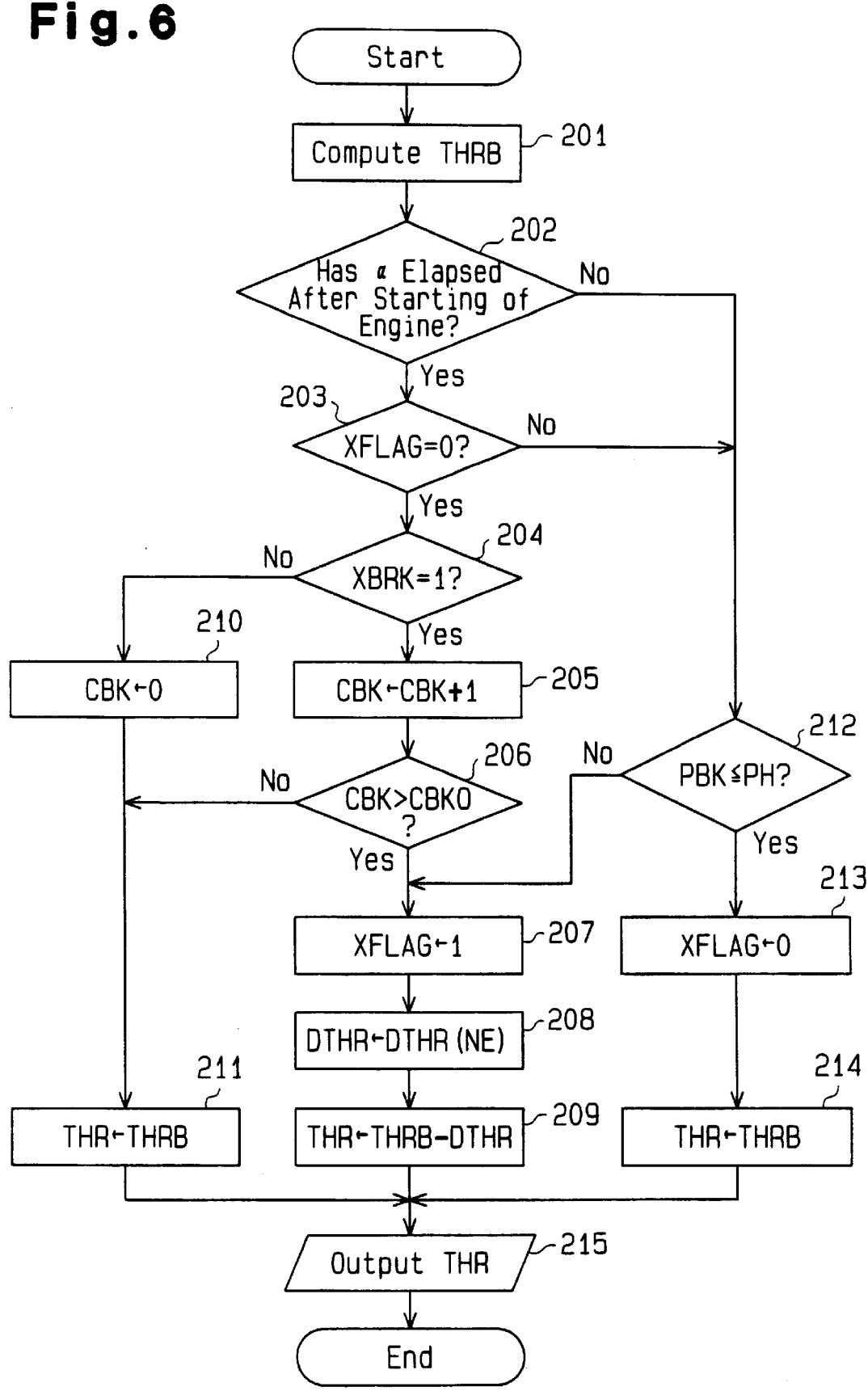
FIG. 6 is a flowchart showing a program executed by the ECU in a second embodiment according to the present invention.

The second embodiment will now be described with reference to the flowchart shown in FIG. 6. In step 201, the ECU 30 computes the reference throttle angle THRB based on the running condition of the engine 1. In step 202, the ECU 30 determines whether a predetermined time α has elapsed since the starting of the engine 1. If it is determined that the predetermined time a has elapsed, the ECU 30 proceeds to step 203. In step 203, the ECU 30 determines whether the flag XFLAG, which indicates the execution of the valve closing control, is set at zero. If the flag XFLAG is set at zero, the ECU 30 proceeds to step 204 and determines whether the brake actuation flag XBRK is set at one.

When it is determined that the actuation flag XBRK is sat at one in step 204, the ECU 30 proceeds to step 205 and adds one to the brake count CBK, which is a count of brake actuation time, in an incremental manner. In step 206, the ECU 30 determines whether the brake count CBK has exceeded a predetermined count value CBKO. If the brake count CBK exceeds the count value CBKO, the ECU 30 determines that the brake pedal 24 has been pressed continuously for longer than a predetermined time. In this case, the ECU 30 proceeds to step 207 and sets the flag XFLAG at one.

Figure 7:
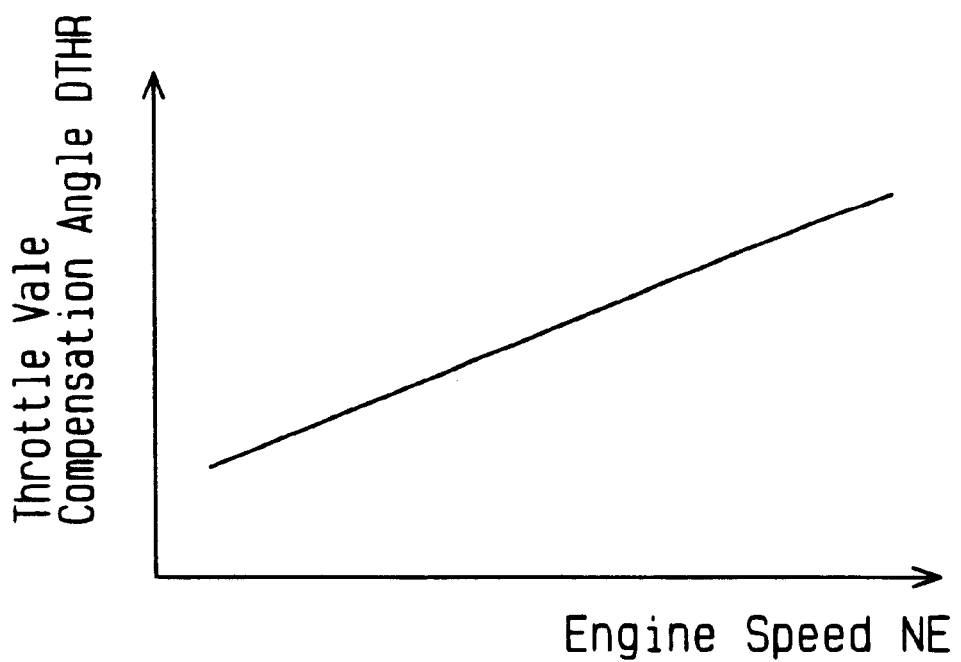
FIG. 7 shows a map for obtaining the opening angle compensation of the throttle valve in the program of FIG. 4.

In step 208, the ECU 30 uses the engine speed NE as a function to obtain the throttle valve compensation angle DTHR from the equation of DTHR=DTHR(NE). A map used to obtain the compensation angle DTHR is shown in FIG. 7. The horizontal axis represents the engine speed NE while the vertical axis represents the compensation angle DTHR. In step 209, the ECU 30 computes the throttle valve angle command value THR by subtracting the compensation angle DTHR from the reference throttle angle THRW. The ECU 30 then proceeds to step 215 to output a signal corresponding to the command value THR.

When it is determined that the brake pedal 24 is not being pressed in step 204, the ECU 30 proceeds to step 210 and resets the brake count CBK at zero. Since the brake pedal 24 is not pressed, it is not necessary to produce negative pressure by closing the throttle valve 23. Thus, in step 211, the ECU 30 sets the reference throttle angle THRB as the command value THR. The ECU 30 then proceeds to step 215 and outputs a signal corresponding to the command value THR.

When it is determined that the value of the brake count CBK has not reached the predetermined count value CBKO in step 206, the brake pedal 24 has not been pressed continuously for longer than a predetermined time period. Thus, it is not necessary to close the throttle valve 23 and produce negative pressure. In this case, the ECU 30 proceeds to step 211. If the predetermined time a has not elapsed since starting the engine 1, the ECU 30 proceeds to step 212 to guarantee the initial negative pressure regardless of the state of the brake pedal 24.

If the flag XFLAG is set at one in step 203, the ECU determines that the closing control of the throttle valve 23 is being carried out and proceeds to step 212. In step 212, the ECU 30 determines whether the brake booster pressure PBK is lower than the reference pressure PH, which is the higher negative pressure required to actuate the brake booster 71. If the brake booster pressure PBK is higher than the reference pressure PH, the ECU 30 proceeds to step 207 to produce the necessary negative pressure for actuating the brake booster 71. The throttle valve 23 is closed by carrying out step 207.

If the booster pressure PBK is equal to or lower than the reference pressure PH in step 212, the ECU 30 determines that the negative pressure is sufficient for actuating the brake booster 71. In this case, the ECU 30 sets the throttle valve closing flag XFLAG at zero in step 213 and then proceeds to step 214. At step 214, the reference throttle angle THRB is set as the throttle valve angle command value THR. At atop 215, the ECU 30 outputs a signal corresponding to the command value THR.

In this embodiment, negative pressure need not be produced unless the brake pedal 72 is pressed longer than predetermined time. Accordingly, the throttle valve 23 is not closed as often as in the prior art. This drastically reduces the combustion disturbance caused when performing throttle valve control.

Figure 9:
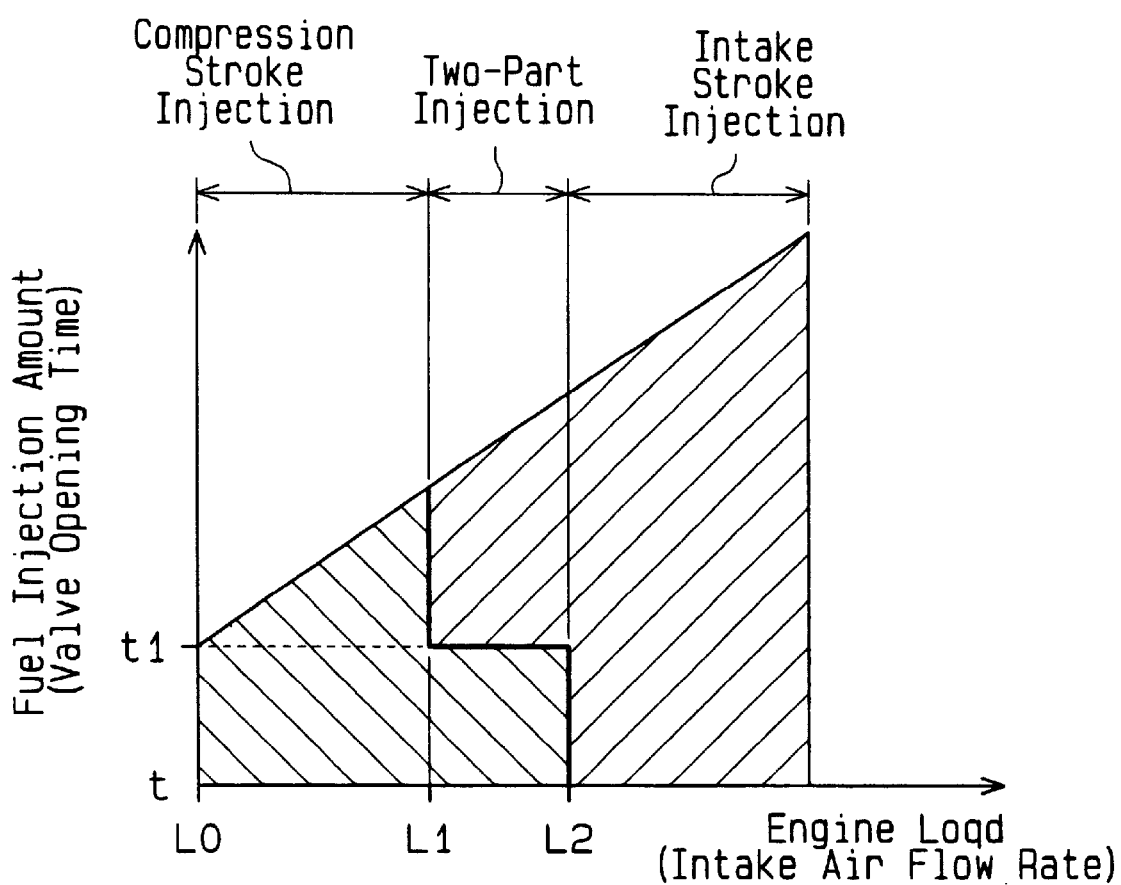
FIG. 9 is an explanatory drawing showing the fuel injection mode in the third embodiment.
Figure 10:
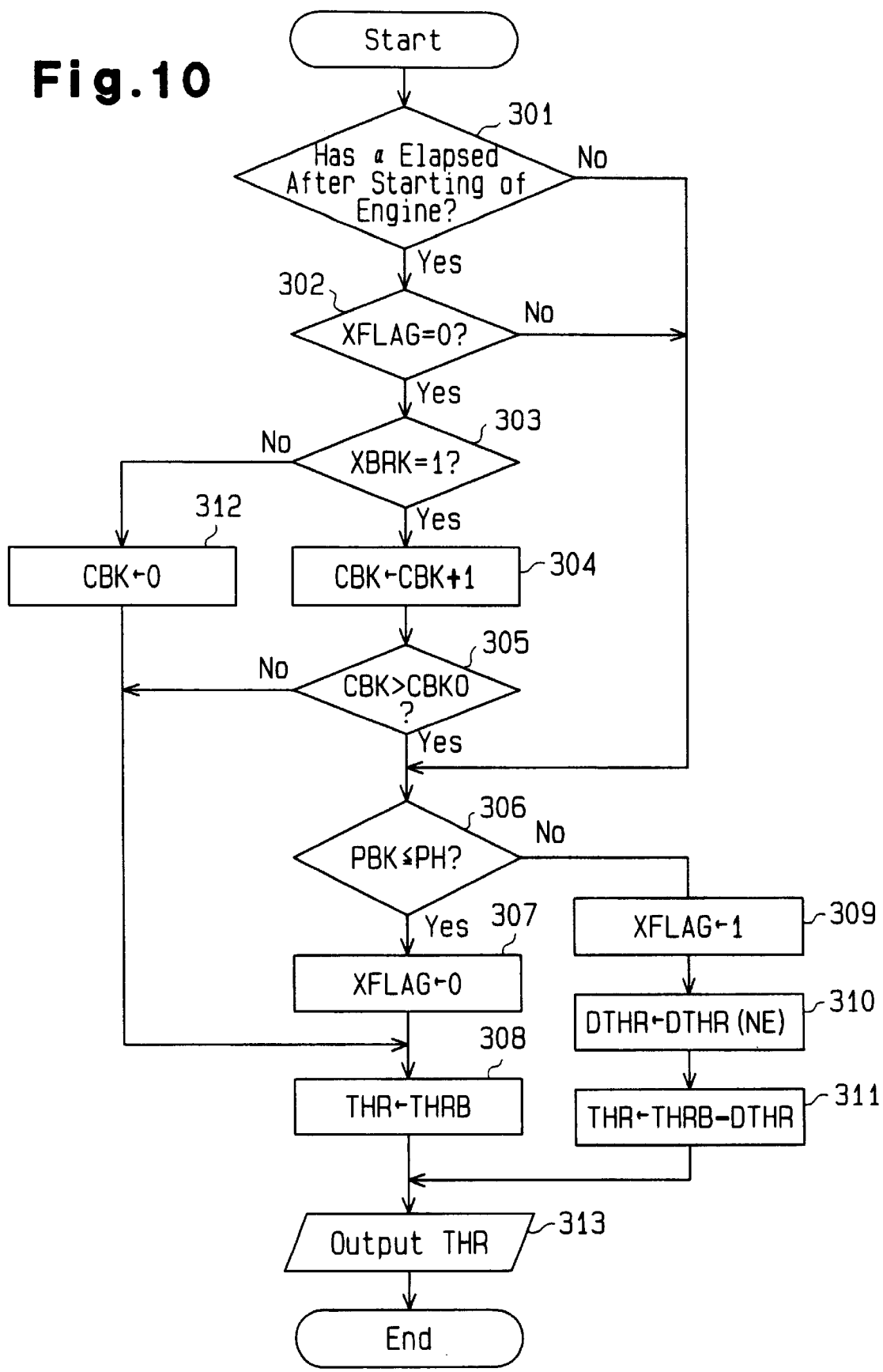
FIG. 10 is a flowchart showing a program executed by the ECU in the third embodiment.

A third embodiment according to the present invention will now be described with reference to FIGS. 8 to 10.

Figure 8:
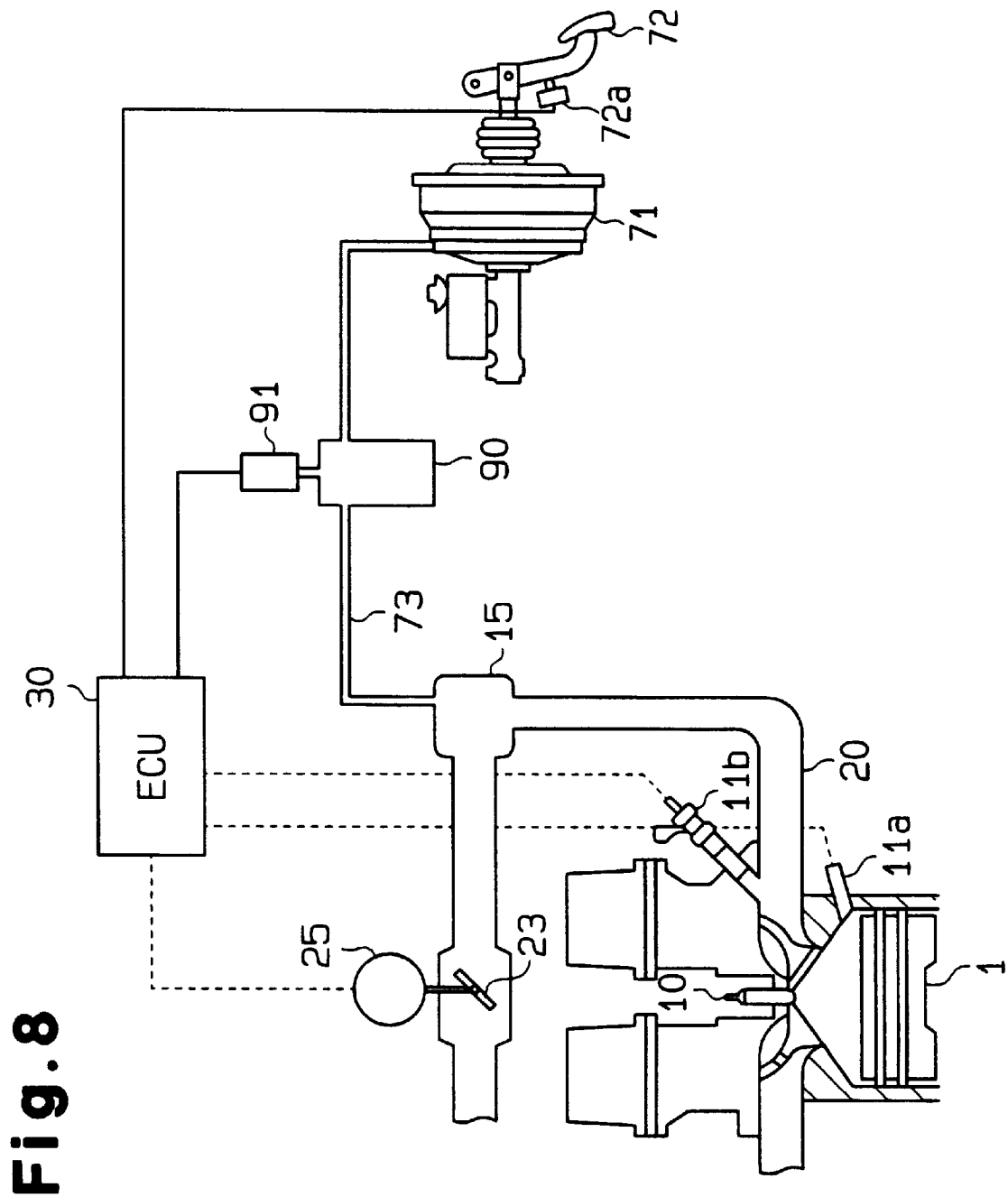
FIG. 8 is a diagrammatic view showing the mechanical structure of a third embodiment according to the present invention.

As shown in FIG. 8, a negative pressure reserve tank 90 is provided in the connecting pipe 73 of the negative pressure control apparatus. A pressure sensor 91 is connected to the reserve tank 90. Negative pressure is accumulated in the reserve tank 90. The reserve tank 90 lengthens the time period during which the brake booster vacuum is adequate. Thus, the number of times the throttle valve is closed is reduced.

In a stratified combustion engine, to which the present invention is mainly applied, the throttle valve 23 is completely opened most of the time. Thus, the closing of the throttle valve 23 effectively produces negative pressure. However, closing of the throttle valve 23, especially when performing stratified charge combustion, hinders stable combustion. The fuel injection mode of a typical stratified combustion engine is illustrated in FIG. 9. In this drawing, the horizontal axis represents the engine load (corresponding to the flow rate of the intake air as an example) while the vertical axis represents the injected amount of fuel (corresponding to the time period during which the injection valve is opened).

When the engine load is within the range of L0 to L1, fuel is injected from a stratified charge injection valve 11a toward the vicinity of the ignition plug 10 in the compression stroke to perform strong stratified charge combustion. If the engine load is within the range of L1 to L2, the injection is divided into two parts. During time period t, fuel is injected from the stratified charge injection valve 11a in the compression stroke until time t1 elapses. During the remaining time period (t–t1), fuel is injected from a uniform charge injection valve 11b in the intake stroke. This causes the air-fuel mixture in the cylinder to be in a weak stratified state.

If the engine load becomes higher than L2, fuel is injected through the uniform charge injection valve 11b during the entire fuel injection period in the intake stroke. If the throttle valve 23 is closed when fuel is injected through the uniform charge injection valve 11b, the air-fuel mixture at the vicinity of the ignition plug may be excessively rich. This hinders ignition.

In addition, it is more beneficial if fuel to injected using only the stratified charge injection valve during the intake stroke when uniform charge combustion is required. To cope with these matters, the following fifth embodiment has been proposed.

A routine executed in the third embodiment will now be described with reference to the flowchart of FIG. 10. In step 301, the ECU 30 determines whether a predetermined time α has elapsed since the starting of the engine 1. When it is determined that the predetermined time α has elapsed, the ECU 30 proceeds to step 302. In step 302, the ECU 30 determines whether the throttle valve closing flag XFLAG, which indicated performance of throttle valve closing control, is set at zero. If the flag XFLAG is set at zero, indicating that the valve closing control is not being executed, the ECU 30 proceeds to step 303 and determines whether the brake actuation flag XBRK is set at one.

When it is determined that the actuation flag XBRK is set at one in step 303, the ECU 30 proceeds to step 304 and adds on to the brake count CBK, which indicates the occurrence of brake actuation, in an incremental manner. In step 305, the ECU 30 determines whether the brake count CBK has exceeded a predetermined count value CBKO. If the brake count CBK exceeds the count value CBKO, the ECU 30 determines that the brake pedal 24 has been promised continuously for longer than a predetermined time. In this case, the ECU 30 proceeds to stop 306 and determines whether the brake booster pressure PBK is equal to or lower than the predetermined pressure PH, which is required to actuate the brake booster.

If it is determined that the brake booster pressure PBX is equal to or lower than the predetermined pressure PH in step 306, the ECU 30 proceeds to stop 307 and sets the throttle valve closing flag XFLAG at zero. In step 308, the ECU 30 sets the reference throttle angle THRB as the throttle valve angle command value THR. The ECU 30 then outputs a signal corresponding to the command value THR in step 313.

When the brake booster pressure PBK is higher than the predetermined pressure PH in step 306, the ECU 30 determines that the negative pressure for actuating the brake booster 71 is insufficient. In this case, the ECU 30 proceeds to step 309 and mete the throttle valve closing flag XFLAG at one. In step 310, the ECU 30 uses the engine speed NE as a function to obtain the throttle valve compensation angle DTHR. In step 311, the ECU 30 computes the throttle valve angle command value THR by subtracting the compensation angle DTHR from the reference throttle angle THRB. The ECU 30 then proceeds to step 313 to output a signal corresponding to the command value THR.

If it is determined that the brake actuation flag XBRK is set at zero in step 303, this indicates that the brake pedal 24 is not being pressed. In this case, the ECU 30 proceeds to step 312 and resets the brake count CBK at zero. The ECU 30 then proceeds to step 308. If it is determined that the brake count CBK is equal to or smaller than the count value CBKO in stop 305, the ECU 30 proceeds to step 308.

Figure 11:
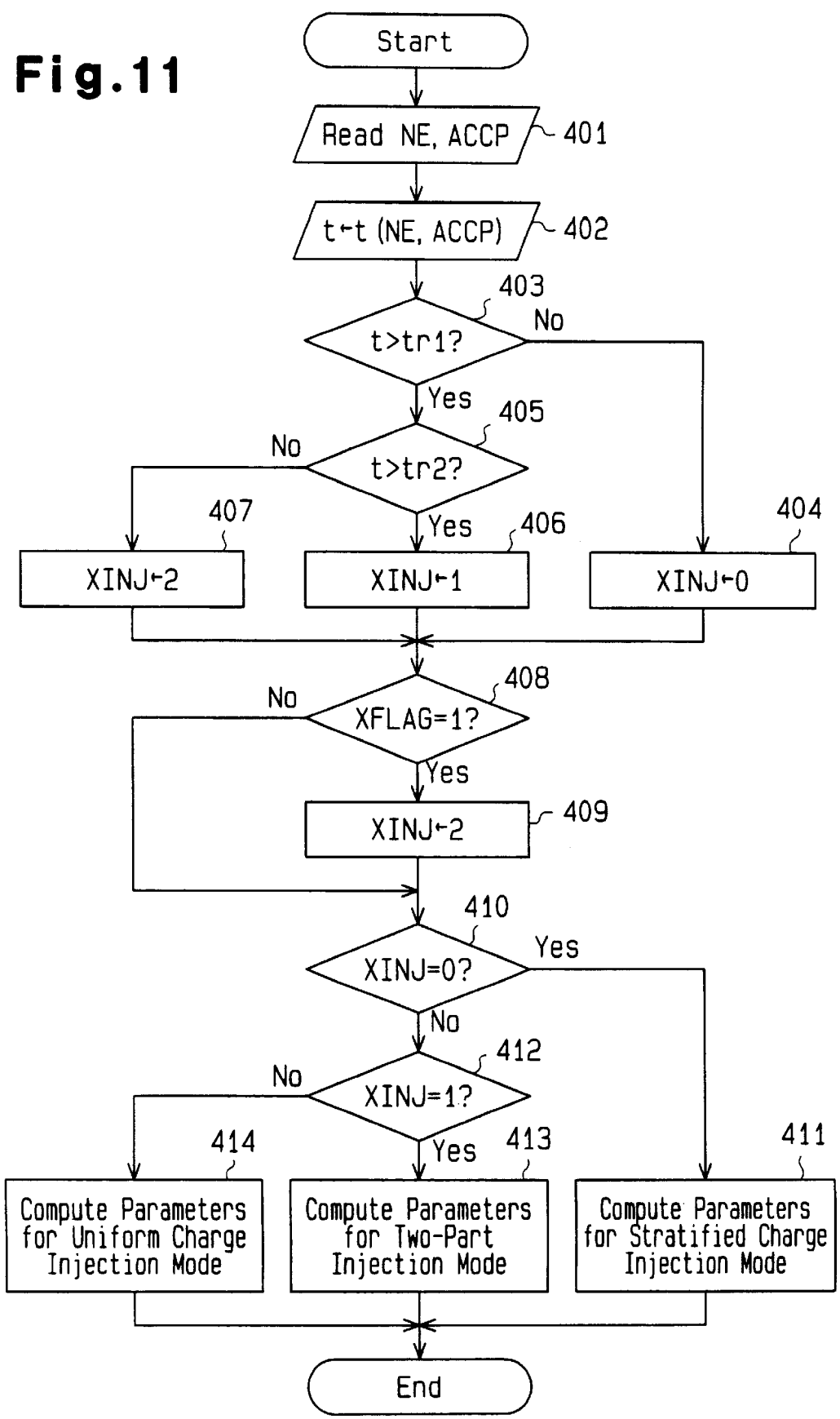
FIG. 11 is a flowchart showing the fuel injection routine executed by the ECU in the first, second, and third embodiments.

FIG. 11 shows a flowchart of the fuel injection mode control that is executed by the ECU 30. This control routine is executed as part of the main routine.

In step 401, the ECU 30 reads the engine speed NE and the degree of acceleration pedal depression ACCP. In step 402, the ECU 30 uses the engine speed NE and the degree of pedal depression ACCP to compute the injection valve opening time period t. In step 403, the ECU 30 determines whether the opening time period t is longer than the first reference time period tr1. The first reference time period tr1 indicates the period of time during which the amount of fuel injection is small and the load applied to the engine 1 is small. If it is determined that the opening time period t is equal to or shorter than the reference time period tr1 in step 403, the ECu 30 proceeds to step 404 and sets the fuel injection mode flag XINJ at zero. This indicates that the strong stratified injection mode is being carried out.

When the opening time period t is longer than the reference time period tr1, the ECU 30 proceeds from stop 403 to step 405. In step 405, the ECU 30 determines whether the opening time period t is shorter than the second reference time period tr2. The second time period tr2 indicates the period of time during which a medium level of load is applied to the engine when the injection valve is opened. The values of the first and second reference time periods tr1, tr2 may be fixed. As another option, the values may be a function of the engine speed NE.

If it is determined that the opening time period t is shorter than the second reference time period tr2, the ECU 30 proceeds to step 406 and sets the fuel injection mode flag XINJ at one. This indicates that the two-part injection mode is being carried out. If the opening time period t is equal to or longer than the second reference time period tr2 in step 405, a high level of load is applied to the engine 1. In thin case, the ECU 30 proceeds to step 407 and sat& the fuel injection mode flag XINJ at two. This indicates that the uniform charge injection mode is being carried out.

After performing step 404, 406, or 407, the ECU 30 proceeds to step 408 and determines whether the throttle valve closing flag XFLAG is set at one. That is, the ECU 30 judges whether the throttle valve 23 is closed to produce negative pressure.

If the flag XFLAG is set at one in step 408, the ECU 30 proceeds to step 409 and forcibly changes the fuel injection mode flag XINJ to two, which indicates the uniform charge injection mode. By forcibly switching to the uniform charge injection mode, ignition is guaranteed when the throttle valve is closed to produce negative pressure in the medium and high level load range during which the injected amount of fuel is relatively small. The ECU 30 then proceeds to stop 410.

If the flag XFLAG is not set at one in step 408, this indicates that the throttle valve 23 is not closed. In this case, the ECU 30 proceeds directly to step 410. When proceeding to step 410 from either step 408 or step 409, the ECU 30 determines whether the fuel injection mode flag XINJ is set at zero. If set at zero, the ECU 30 proceeds to step 411 and computes the parameters for the stratified charge injection mode. The routine is terminated afterward.

If the flag XINJ is not set at zero in step 410, the ECU 30 proceeds to step 412 and determines whether the flag XINJ is set at one. When set at one, the ECU 30 proceeds to step 413 and computes the parameters for the two-part injection mode. The routine is terminated afterward. If the flag XINJ is not set at one in step 412, the ECU 30 proceeds to step 414 and computes the parameters for the uniform charge injection mode. The routine is terminated afterward.

The ECU 30 stores the fuel injection parameters in the form of maps for each mode.

This preferred embodiment guarantees the negative pressure that is required to actuate the brake booster 71 without degrading the ignitability of the air-fuel mixture regardless of the running state of the engine 1.

Figure 12:
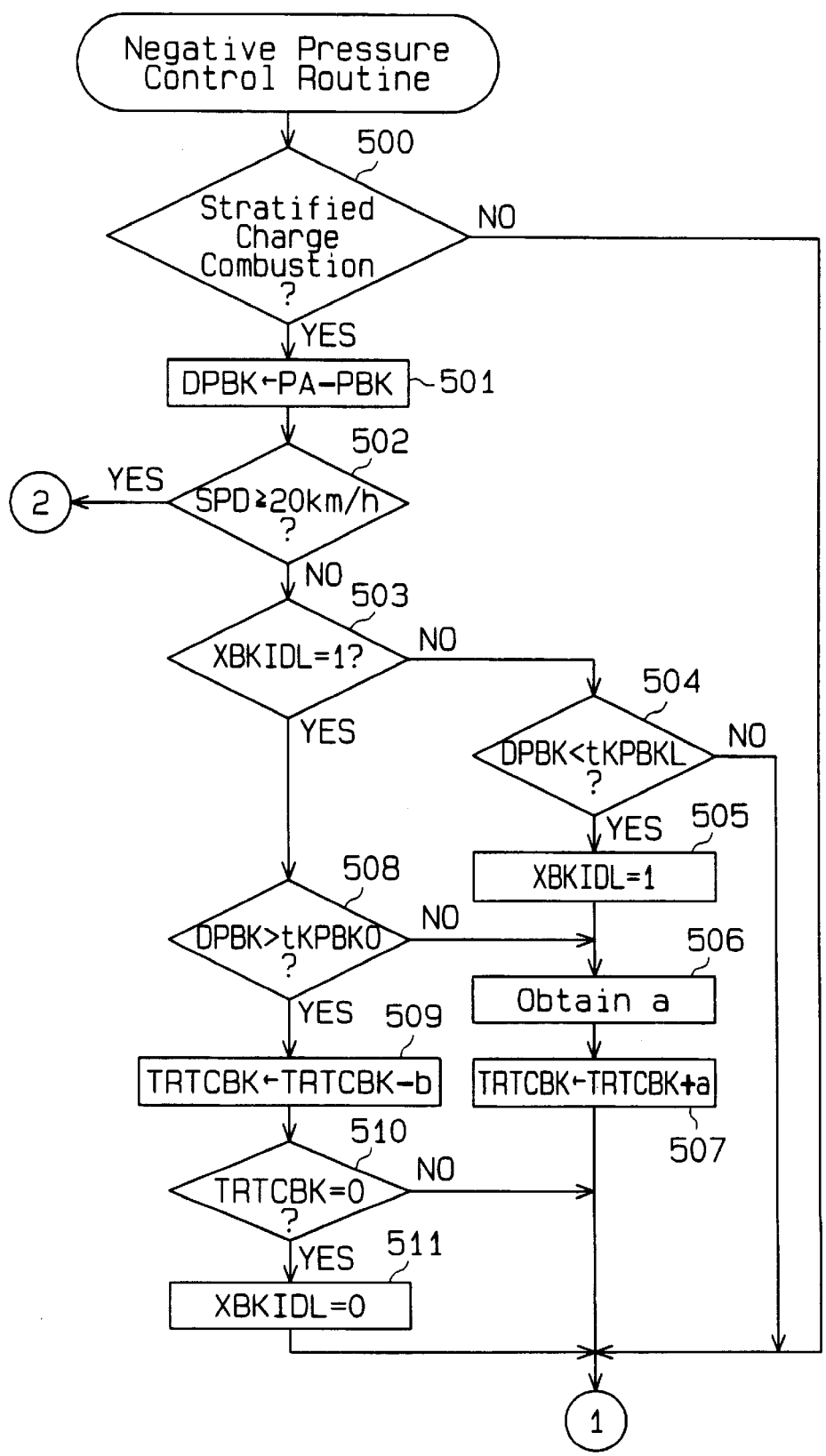
FIG. 12 is a flowchart showing a program executed by the ECU in a fourth embodiment according to the present invention.
Figure 13:
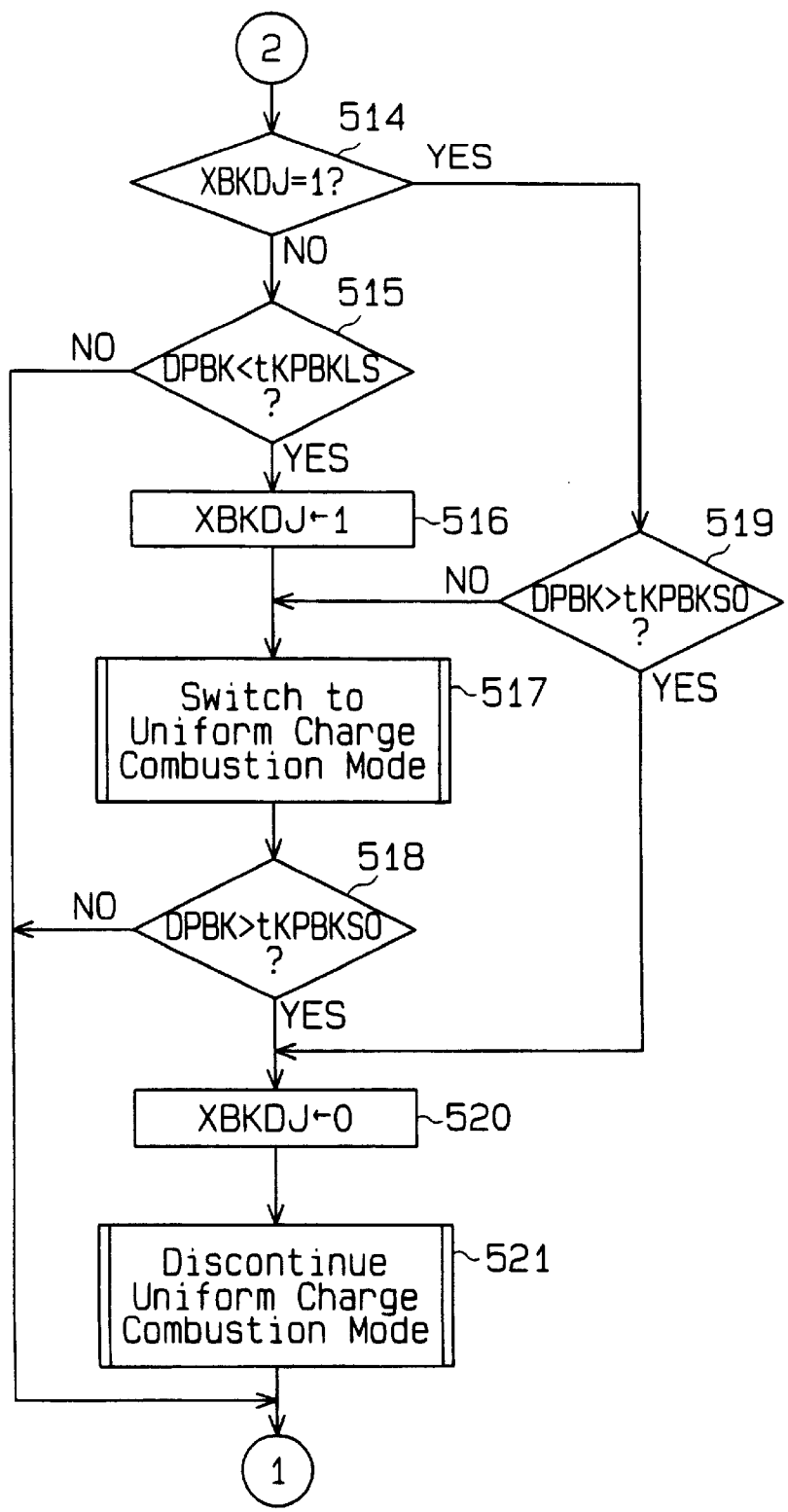
FIG. 13 is a flowchart showing a program that derives from the program shown in FIG. 12.
Figures 14, 15:
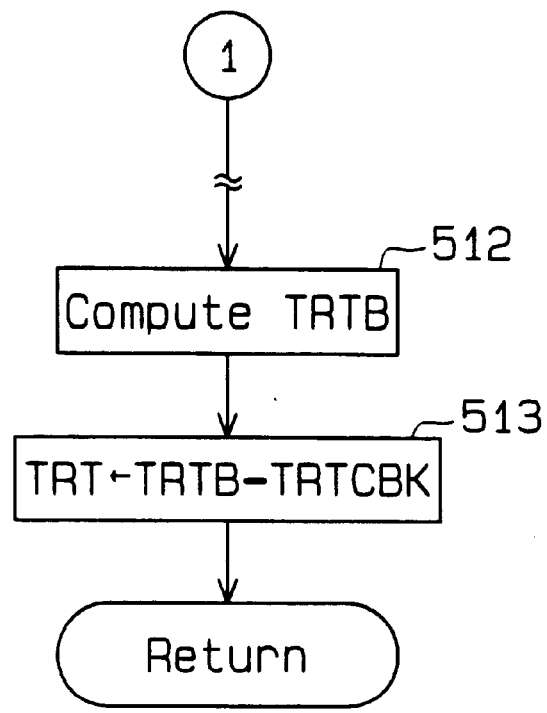
FIG. 14 is a flowchart showing a program that continues from FIG. 12.
FIG. 15 is a table (map) showing the relationship between the closing compensation angle and the value obtained by subtracting the brake booster pressure value from the negative pressure value when terminating stratified charge brake control.

A fourth embodiment according to the present invention will now be described with reference to the flowchart shown in FIGS. 12 to 14. In the routine illustrated in the flowchart, the throttle valve 23 (step motor) 22 is controlled to control the negative pressure communicated to the brake booster 71.

When entering the routine, the ECU 30 first determines whether the engine 1 is presently performing stratified charge combustion in step 500. If stratified charge combustion is not being performed, the ECU 30 determines that the engine 1 is presently performing uniform charge combustion. This indicates that problems related with negative pressure are unlikely to occur. In this case, the ECU 30 proceeds to step 512.

In step 512, the ECU 30 computes the basic throttle angle TRTB from the present detecting signals (the degree of acceleration pedal depression ACCP, the engine speed NE, and other parameters). The ECU 30 refers to a map (not shown) to compute the basic throttle angle TRTB. The ECU 30 proceeds to step 513 and sets the final target throttle angle, or throttle opening area TRT, by subtracting the present throttle closing angle TRTCBK from the basic throttle angle TRTB. The ECU 30 then temporarily terminates subsequent processing. When the ECU 30 jumps from step 500 to step 512, the value of the throttle closing angle TRTCBK is set at zero. Thus, the basic throttle angle TRTB is set equal to the final target throttle opening area TRT.

In step 500, if it is determined that the engine 1 is performing stratified charge combustion, the ECU 30 proceeds to step 501. At step 501, the ECU 30 subtracts the most recent brake booster pressure PBX, which is detected by the pressure sensor 63, from the atmospheric pressure PA to obtain the pressure difference DPBK.

In step 502, the ECU 30 determines whether the present vehicle speed SPD is equal to or higher than a predetermined speed (e.g., 20 km/h). If the vehicle speed SPD is lower than the predetermined speed, the ECU 30 continues the stratified charge combustion mode and proceeds to step 503 to execute the throttle angle control (stratified charge brake control).

In step 503, the ECU 30 determines whether the flag XBKIDL that indicates the execution of the stratified charge brake control is set at one. The execution flag XBKIDL is set at one when producing negative pressure while performing the stratified charge combustion mode. If the execution flag XBKIDL is set at zero, that is, if the stratified charge control is not in process, the ECU 30 proceeds to step 504.

In step 504, the ECU 30 determines whether the present pressure difference DPBK is smaller than a predetermined negative pressure value tKPBLK (e.g., 300 mmHg), which initiates the stratified charge brake control. It the pressure difference DPBK is smaller than the negative pressure value tKPBLK, the ECU 30 proceeds to step 505.

In step 505, the ECU 30 sets the execution flag XBKIDL to one to enter the stratified charge brake control mode. The ECU 30 then proceeds to step 506 and computes the closing compensation angle a. To obtain the closing compensation value a, the ECU 30 refers to a map such as that shown in FIG. 15. In the map, the closing compensation angles a are Indicated in correspondence with values that are obtained by subtracting the value of the pressure difference DPBK from the target negative pressure value tKPBKO (e.g., 350 mmHg). If the pressure difference DPBK is much smaller than the predetermined negative pressure value tKPBKO (i.e., if the subtracted value is large), the closing compensation angle a is set at a large value to increase the closing speed of the throttle valve 23. On the contrary, the closing compensation angle a is set at a small value to decrease the closing speed of the throttle valve 23 when the pressure difference DPBK approaches the predetermined negative pressure value tKPBKO (i.e., when the subtracted value is small).

In step 507, the ECU 30 renews the throttle closing angle TRTCBK to a value obtained by adding the present closing angle compensation value a to the throttle closing angle TRTCBK of the previous cycle and then proceeds to step 512. In step 512, the ECU 30 computes the basic throttle angle TRTB. Then, in step 513, the ECU 30 sets the final target throttle opening area TRT by subtracting the present throttle closing angle TRTCBK from the basic throttle angle TRTB. Afterward, the ECU 30 temporarily terminates subsequent processing. Accordingly, if the ECU 30 carries out steps 503 to 507, the increasing value obtained by subtracting the throttle closing angle TRTCBK is set as the final target throttle opening area TRT.

In step 504, if the pressure difference DPBK is equal to or greater than the negative pressure value tRPBLK that initiates the stratified charge brake control, the ECU 30 jumps to step 512. In this case, stratified charge brake control is not executed.

If the execution flag XBKIDL is set at one in step 503, the ECU 30 proceeds to step 508 and determines whether the pressure difference DPBK exceeds the negative pressure value tKPBKO that terminates the stratified charge brake control. If it is determined that the pressure difference DPBK does not exceed the negative pressure value tKPBKO, the ECU 30 proceeds to step 506. The ECU 30 carries out steps 506, 507 and then proceeds to step 512 to compute the basic throttle angle TRTB. Subsequently, in step 513, the ECU 30 vets the final target throttle opening area TRT to a value obtained by subtracting the present throttle closing angle TRTCBK from the basic throttle angle TRTB. Afterward, the ECU 30. temporarily terminates subsequent processing. Accordingly, in this case, the value obtained by subtracting the presently increasing throttle closing angle TRTCBK is set as the final target throttle opening area TRT.

If it is determined that the pressure difference DPBK exceeds the negative pressure value tKPBKO in step 508, the ECU 30 proceeds to step 509 to decrease the throttle closing angle TRTCBK (and increase the target throttle opening area TRT). At step 509, the ECU 30 renews the throttle closing angle TRTCBK to a value obtained by subtracting a predetermined closing angle compensation value b (b is a constant value) from the throttle closing angle TRTCBK of the previous cycle.

In step 510, the ECU 30 determines whether the throttle closing angle TRTCBK corresponds to a value of zero. If it in determined that the throttle closing angle TRTCBK does not correspond to a value of zero, the ECU 30 proceeds to step 512 to compute the basic throttle angle TRTB. Subsequently, in step 513, the ECU 30 sets the final target throttle opening area TRT to a value obtained by subtracting the present throttle closing angle TRTCBK from the basic throttle angle TRTB. Afterward, the ECU 30 temporarily terminate subsequent processing. Accordingly, in this case, the value obtained by subtracting the presently decreasing value of the difference between the throttle closing angle TRTCBK and the basic throttle angle TRTB is set as the final target throttle opening area TRT.

If the throttle closing angle TRTCBK corresponds to a value of zero in atop 510, the ECU 30 proceeds to step 511. At step 511, the ECU 30 sets the execution flag XBKIDL to zero to terminate the stratified charge brake control mode. The ECU 30 then carries out steps 512, 513 and temporarily terminates subsequent processing. When the ECU 30 proceeds from step 511 to step 512, the value of the throttle closing angle TRTCBK is set at zero. Thus, the basic throttle angle TRTB is set equal to the final target throttle opening area TRT.

In step 502, if the present vehicle speed SPD is equal to or higher than the predetermined speed, the ECU 30 proceeds to step 514 to temporarily perform uniform charge combustion while executing throttle angle control (uniform charge combustion brake control).

In step 514, the ECU 30 determines whether the flag XBKDJ that indicates execution of the uniform charge combustion brake control is set at one. The execution flag XBKDJ is set at one when negative pressure is guaranteed by the performance of the uniform charge combustion. If determined that the execution flag XBKDJ is not set at one but set at zero, the ECU 30 proceeds to step 515.

In step 515, the ECU 30 determines whether the present pressure difference DPBK is smaller than the negative pressure value tKPBKLS at which the uniform charge brake control is initiated,(e.g., 300 mmHg). If determined that the pressure difference DPBK is equal to or greater than the negative pressure value tKPBKLS, the ECU 30 jumps to step 512. In this case, the uniform charge combustion brake control is not carried out.

If the pressure difference DPBK is smaller than the negative pressure value tKPBKLS, the ECU 30 determines that negative pressure is insufficient and proceeds to step 516. At step 516, the ECU 30 sets the execution flag XBKDJ at one to execute uniform charge combustion control. The ECU 30 then proceeds to step 517 and temporarily switches to the uniform charge combustion mode. During stratified charge combustion, either the stratified charge combustion mode or the uniform charge combustion mode is performed. The stratified charge combustion control is usually performed. However, uniform charge combustion control is performed when necessary. In this mode, the throttle valve 23 is opened and closed in accordance with the load applied to the engine 1 by supplying the necessary amount of air-fuel mixture to produce the power required by the engine 1.

In step 518, the ECU 30 determines whether the present pressure difference DPBK is greater than the negative pressure value tKPBKSO at which the uniform charge combustion brake control is terminated (e.g., 350 mmHg). In most cases, the pressure difference DPBK is still equal to or smaller than the negative pressure value tKPBKSO. In such cases, the ECU 30 proceeds to steps 512, 513. This causes the engine 1 to completely enter uniform charge combustion. Thus, the throttle valve 23 is closed to communicate negative pressure to the brake booster 71.

In step 514, if the execution flag XBKDJ is set at one indicating execution of uniform charge brake control (and indicating that uniform charge combustion is in progress), the ECU 30 proceeds to step 519. At step 519, the ECU 30 determines whether the present pressure difference DPBK is greater than the negative pressure value tKPBKSO at which the uniform charge combustion brake control is terminated (e.g., 350 mmHg). If the pressure difference DPBK is still not greater than the negative pressure, the ECU 30 repeats steps 517, 512, 513 and continues uniform charge combustion.

When sufficient negative pressure is communicated to the brake booster 71 as a result of the uniform charge combustion mode causes the pressure difference DPBK to becomes greater than the negative pressure value tKPBKSO, at which the uniform charge brake control is terminated, the ECU 30 proceeds to step 520. The ECU 30 proceeds to step 520 from either step 519 or step 518 (in most cases from step 519). At step 520, the ECU 30 determines that there is no need to further produce negative pressure and sets the execution flag XBKDJ to zero. In atop 521, the ECU 30 discontinues the uniform charge combustion mode and enters the stratified charge combustion mode. The ECU 30 then carries out steps 512, 513 and terminates subsequent processing.

In the negative pressure control routine, the pressure difference DPBK is computed from the atmospheric pressure PA and the brake booster pressure PBK. The closing control of the throttle valve 23 (negative pressure guaranteeing control) in executed when the pressure difference DPBK is smaller than the negative pressure value tKPBKL, which initiates stratified charge brake control, or smaller than the negative pressure value tKPBKLS, which initiates uniform charge combustion control. If the vehicle speed SPD is lower than the predetermined speed, a negative pressure that guarantees control for stratified charge combustion is provided. If the vehicle speed SPD is equal to or higher than the predetermined speed, a negative pressure guaranteeing control for uniform charge combustion is provided.

In addition, it is determined whether the negative pressure that actuates the brake booster 71 is sufficient (steps 504, 515, etc.). When it is determined that the negative pressure is insufficient, the angle closing control of the throttle valve 23 is carried out. The closing of the throttle valve 23 increases the negative pressure (reduces the pressure) and guarantees the operation of the brake booster 71.

To determine whether it is necessary to produce negative pressure for the actuation of the brake booster 71, the difference between the atmospheric pressure PA and the brake booster pressure PBK, which is detected by the pressure sensor 63, is computed to obtain the pressure difference DPBK. If the pressure difference DPBK is smaller than either the negative pressure value tKPBKL, at which stratified charge brake control is initiated, or the negative pressure value tKPBKLS, at which the uniform charge brake control is initiated, the closing control of the throttle valve 23 (negative pressure ensuring control) is carried out.

Thus, as shown in FIG. 18, when traveling at a high altitude, the decrease in the atmospheric pressure PA causes the brake booster pressure PBK to be lower than when traveling at a low altitude. Accordingly, the brake booster pressure PBK may be low while the actual negative pressure for actuating the brake booster 71 is insufficient. However, in this embodiment, the closing control of the throttle valve 23 is executed to produce negative pressure when tho pressure difference DPBK, and not the brake booster pressure PBK, is smaller than the reference value (negative pressure value tKPBKL for initiating stratified charge brake control or the negative pressure value tKPBKLS for initiating uniform charge brake control). This always guarantees sufficient negative pressure for the actuation or the brake booster 71 even when the atmospheric pressure PA fluctuates such an when traveling at high altitudes.

Furthermore, the closing control of the throttle valve 23 is executed if the pressure difference DPBK is smaller than the reference value (negative pressure value tKPBKL for initiating stratified charge brake control or negative pressure value tKPBKLS for initiating uniform charge broke control), and the closing control is terminated if the pressure difference DPBK becomes greater than a larger reference value (negative pressure value tKPBKO for terminating stratified charge brake control or negative pressure value tKPBKSO for terminating uniform charge brake control). In other words, the reference value has a hysteresis. This prevents hunting caused by the pressure difference DPBK becoming smaller than the reference value and then equal to or greater than the reference value in a repetitive manner. Repetitive execution and non-execution of the closing control does not take place.

Although the opening area of the intake passage is narrowed to produce negative pressure, an electronically controlled throttling mechanism that includes the throttle valve 23 and the step motor 22 is employed as a means to guarantee negative pressure. Thus, conventional devices are used to produce negative pressure. This lowers costs.

In this embodiment, when increasing the throttle closing angle TRTCBK, the throttle closing angle TRTCBK is renewed by adding the presently set closing angle compensation value b to the throttle closing angle TRTCBK of the previous cycle. The closing angle compensation value a is set at a large value if the pressure difference DPBK is much smaller than the negative pressure value tKPBKO for terminating stratified charge brake control. Therefore, as shown in FIG. 19, the closing speed is high immediately after the initiation of the closing control. This readily guarantees negative pressure.

If the pressure difference DPBK approaches the negative pressure value tKPBKO for terminating stratified charge brake control, the closing angle compensation value a is set at a small value. Thus, when a certain time elapses after starting the closing control, the closing speed decreases. This suppresses overshooting of the closing action and the negative pressure.

Figure 16:
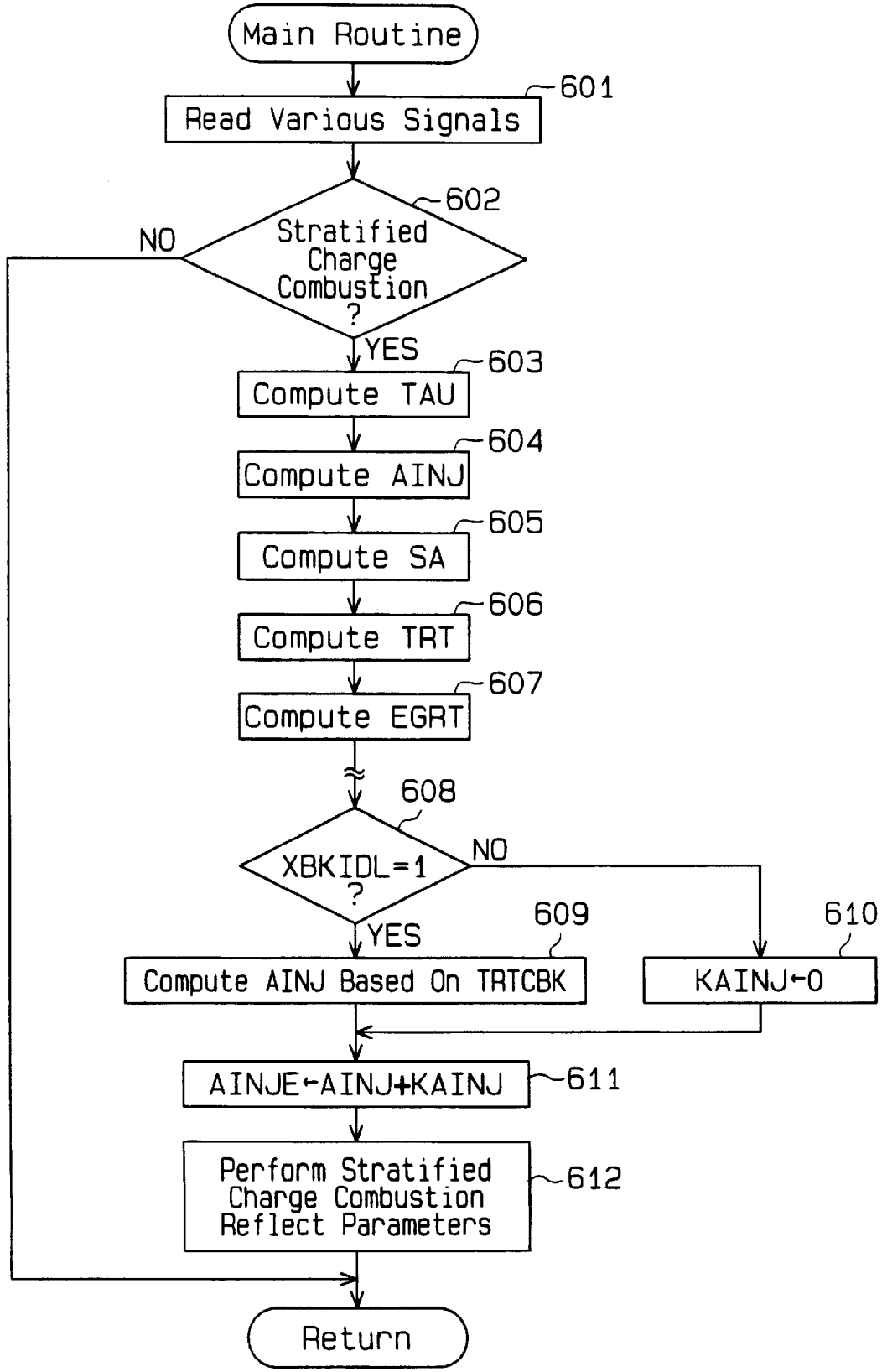
FIG. 16 is a flowchart showing a main routine executed by the ECU.

The injection timing control executed during stratified charge combustion negative pressure control (stratified charge combustion brake control) will now be described. The fuel injection control is executed to prevent the air-fuel ratio from becoming rich when performing stratified brake control. FIG. 16 shows a flowchart of a main routine of the fuel injection control executed by the ECU 30.

When entering the main routine, the ECU 30 first reads various detecting signals such as the degree of acceleration pedal depression ACCP and the engine speed NE in step 601.

In step 602, the ECU 30 determines whether stratified charge combustion is being performed. If the stratified charge combustion is not being performed, the ECU 30 temporarily terminates subsequent processing. If the stratified charge combustion is being performed, the ECU 30 proceeds to step 603 and computes the target fuel injection amount TAU.

In step 604, the ECU 30 computes the basic fuel injection timing AINJ (in relation with when the piston is located at the top dead center position). In step 605, the ECU 30 computes the target ignition timing SA. In step 606, the ECU 30 computes the basic throttle opening area TRT. In step 607, the ECU 30 computes the target EGR opening area EGRT.

After obtaining the parameters, the ECU 30 determines whether the flag XBKIDL indicating the execution of the stratified charge brake control is set at one. If the execution flag XBKIDL is get at one, the ECU 30 proceeds to step 609 and computes the fuel injection timing compensation angle KAINJ based on the present throttle closing angle TRTCBK. The ECU 30 refers to a map shown in FIG. 17 to compute the injection timing compensation angle KAINJ. In other words, if the throttle closing angle TRTCBK indicates a value of zero, the injection timing compensation angle KAINJ is set at zero. As the value of the throttle closing angle TRTCBK becomes greater, the fuel injection compensation value KAINJ is set at a larger value (toward advancement).

If the execution flag XBKIDL is not set at one but set at zero, the ECU 30 proceeds to step 610 since there is no need to compensate the injection timing. At step 610, the ECU 30 sets the injection timing compensation angle KAINJ to zero.

The ECU 30 proceeds to step 611 from either step 609 or step 610 and advances the basic injection timing AINJ by adding the injection timing compensation angle KAINJ. The obtained value is set as the final target injection timing AINJE. At atop 612, the parameters are reflected in the stratified charge combustion. Subsequent processing is then temporarily terminated.

In the main routine, the closing control of the throttle valve 23 is carried out while performing stratified charge combustion If the stratified charge brake control in executed. In this case, the target injection timing AINJE is advanced from the basic injection timing AINJ by the injection timing compensation angle KAINJ. This prevents the air-fuel ratio from becoming rich.

Figure 20:
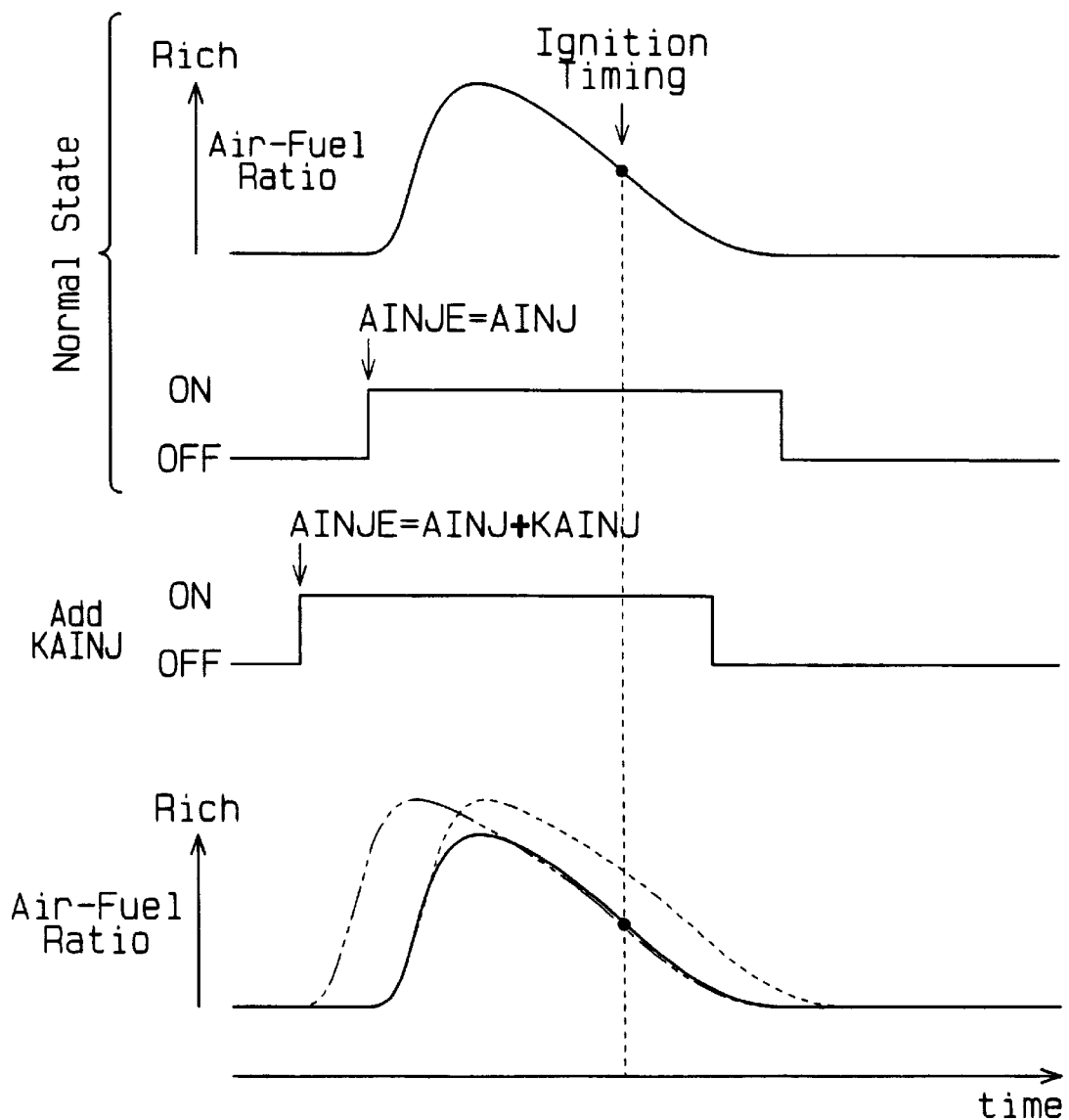
FIG. 20 is a timing chart showing the relationship between time and air-fuel ratio and between time and the fuel injection signal.

In the main routine, the closing control of the throttle valve 23 is carried out while performing stratified charge combustion during the stratified charge brake control. In this state, the closing of the throttle valve 23 causes the air-fuel ratio to become rich since the intake air amount decreases, as shown by the dotted line in FIG. 20. If normal fuel Injection and ignition is performed with the air-fuel ratio in a rich state, this may result in an undesirable combustion state. However, in this embodiment, the target injection timing AINJE is advanced from the basic injection timing AINJ by the injection timing compensation angle KAINJ, as shown by the double-dotted line in FIG. 20. This guarantees the normal air-fuel ratio during ignition. As a result, the air-fuel ratio is prevented from becoming rich. This prevents an undesirable combustion state.

Although only one embodiment of the present invention has been described so far, it should be apparent to those skilled in the art that the present invention may be embodied in many other specific forms without departing from the spirit or scope of the invention. More particularly, the present invention may be modified as described below.

(1) In the illustrated embodiment, an electronically controlled throttle mechanism is used as the negative pressure producing means. The throttle mechanism includes the throttle valve 23 arranged in the intake duct 20, and the step motor 22 serving as an actuator for opening and closing the throttle valve 23. However, an idle speed control (ISC) mechanism may be used am the negative pressure producing means. Such an ISC mechanism includes an idle speed control valve arranged in an intake passage that bypasses the throttle valve 23 and an actuator for opening and closing the control valve.

The EGR mechanism 51 provided with the EGR valve 53 and other parts may also be employed as the negative pressure producing means.

Negative pressure producing mechanisms other than those shown in the drawings may also be employed. For example, a mechanical throttle valve that is linked to the acceleration pedal may be used in lieu of the electronically controlled throttle valve.

(2) In the illustrated embodiment, the computation of the closing compensation angle a enables the closing speed of the throttle valve 23 to be variable. However, the closing speed may be constant. Furthermore, in the preferred and illustrated embodiment, the fuel injection timing is altered when executing the closing control while performing stratified charge combustion. However, the closing control may be eliminated.

(3) The present invention is applied to the cylinder injection type engine 1 in the illustrated embodiment. The present invention may also be applied to an engine that performs stratified charge combustion and weak stratified charge combustion. For example, the present invention may be applied to an engine that insects fuel beneath the intake valves 6a, 6b provided in the associated intake ports 7a, 7b. The present invention may also be applied to an engine that injects fuel directly into the cylinder bores (combustion chambers 5) from injection valves arranged near the intake valves 6a, 6b. As another option, the present invention may be applied to an engine that does not perform stratified charge combustion.

(4) In the illustrated embodiment, helical type intake ports are employed to produce swirls. However, the swirls do not necessarily have to be produced. In such case, parts such as the swirl control valve 17 and the step motor 19 may be eliminated.

(5) The present invention is applied to a gasoline engine in the illustrated embodiment. However, the present invention may also be applied to other types of engines such as diesel engines.

(6) In the illustrated embodiment, the atmospheric pressure PA is detected by the intake pressure sensor 61. However, an atmospheric pressure sensor may be provided to detect the atmospheric pressure.

Therefore, the present examples and embodiments are to be considered as illustrative and not restrictive and the invention in not to be limited to the details given herein, but may be modified within the scope of the appended claims.

What is claimed is:

1. An apparatus for controlling negative pressure in a combustion engine, wherein said apparatus has a brake booster capable of increasing braking force of a vehicle based on the negative pressure supplied to an interior of the brake booster, said apparatus comprising:

means for generating the negative pressure that is supplied to the brake booster; and means for controlling the generating means, said controlling means actuating the generating means when pressure in the brake booster is in excess of a predetermined magnitude.

2. The apparatus as set forth in claim 1, further comprising means for detecting pressure acting in the brake booster.

3. The apparatus as set forth in claim 2, wherein said detecting means detects the pressure acting in the brake booster as an absolute pressure, wherein the control means actuates the generating means when the absolute pressure is in excess of the predetermined magnitude.

4. The apparatus as set forth in claim 2, further comprising:

said detecting means including first sensor for detecting atmosphere pressure and a second sensor for detecting absolute pressure acting in the brake booster;

means for computing a difference between the atmosphere pressure and the absolute pressure; and said control means actuating the generating means when the difference is smaller than the predetermined magnitude.

5. The apparatus as set forth in claim 1, further comprising:

an air intake passage for supplying air to the engine;

a valve disposed in the air intake passage to control airflow rate therein; and an actuator for actuating the valve, said actuator forms the generating mean in cooperation with the valve.

6. The apparatus as set forth in claim 5, wherein said valve includes a throttle valve.

7. The apparatus as set forth in claim 6, further comprising:

means for detecting an operation state of the engine;

first calculating means for calculating an opening size of the throttle valve based on the operation state of engine;

second calculating means for calculating a correction value that corrects the opening size of the throttle valve calculated by the first calculating means; and said control means actuating the actuator based on the calculated correction value.

8. The apparatus as set forth in claim 7, further comprising:

an injection valve for injecting fuel to the engine;

means for computing a time period for which the injection valve is open, wherein said computing means performs the computing operation based on the operation state of the engine;

first determining means for determining a stable operation of the engine when the opening time period is greater than a predetermined time period; and second determining means for determining the pressure in the brake booster being greater than the predetermined magnitude.

9. The apparatus as set forth in claim 8, wherein said second calculating means calculates the correction value based on engine speed and the opening time period of the injection valve.

10. The apparatus an set forth in claim 7, further comprising:

means for counting for a predetermined time period after the engine has started to operate;

means for comparing the pressure acting in the brake booster with the predetermined magnitude; and said comparing means including means for determining the pressure in the brake booster being greater than the predetermined magnitude.

11. The apparatus as met forth in claim 10, wherein said second calculating means calculates the correction value based on the engine speed.

12. The apparatus as set forth in claim 7, wherein said engine is capable of performing a stratified charge combustion, and wherein said control means functions during the stratified charge combustion.

13. The apparatus as set forth in claim 5, wherein said air intake passage has a diverged passage and wherein said valve includes an idle speed control valve.

14. An apparatus for controlling brake force of a vehicle movable based on rotation of an engine with a plurality of cylinders, each of said cylinders having a combustion chamber that receives fuel from a fuel injector and air from an air intake passage, wherein said air and fuel are mixed and combusted in the combustion chamber, wherein said engine selectively performs a stratified charge combustion and a uniform charge combustion, and wherein said stratified charge combustion mode is selected to increase the amount of the air and the fuel supplied to the engine and improve a combusting state of the engine, said apparatus comprising:

a brake booster capable of increasing braking force of a vehicle by means of the negative pressure supplied to an interior of the brake booster;

means for generating the negative pressure that is supplied to the brake booster; and means for controlling the generating means, said controlling means actuating the generating means when pressure in the brake booster is in excess of a predetermined magnitude.

15. The apparatus as set forth in claim 14, further comprising means for detecting pressure acting in the brake booster.

16. The apparatus as set forth in claim 15, wherein said detecting means detects the pressure acting in the brake booster as an absolute pressure, wherein the control means actuates the generating means when the absolute pressure is in excess or the predetermined magnitude.

17. The apparatus as set forth in claim 14, further comprising:

said detecting means including first sensor for detecting atmosphere pressure and a second sensor for detecting absolute pressure acting in the brake booster;

means for computing a difference between the atmosphere pressure and the absolute pressure; and said control means actuating the generating means when the difference is smaller than the predetermined magnitude.

18. The apparatus as set forth in claim 14, further comprising:

a valve disposed in the air intake passage to control airflow rate therein; and an actuator for actuating the valve, said actuator forms the generating means in cooperation with the valve.

19. The apparatus as set forth in claim 18, wherein said valve includes a throttle valve.

20. The apparatus as set forth in claim 19, further comprising:

means for detecting an operation state of the engine;

first calculating means for calculating an opening size of the throttle valve based on the operation state of engine;

second calculating means for calculating a correction value that corrects the opening size of the throttle valve calculated by the first calculating means; and said control means actuating the actuator based on the calculated correction value.

21. The apparatus as set forth in claim 20, further comprising:

an injection valve for injecting fuel to the engine;

means for computing a time period for which the injection valve is open, wherein said computing means performs the computing operation based an the operation state of the engine;

first determining means for determining a stable operation of the engine when the opening time period is greater than a predetermined time period; and second determining means for determining the pressure in the brake booster being greater than the predetermined magnitude.

22. The apparatus as set forth in claim 21, wherein said second calculating means calculates the correction value based on engine speed and the opening time period of the injection valve.

23. The apparatus as set forth in claim 20, further comprising:

means for counting for a predetermined time period after the engine has started to operate;

means for comparing the pressure acting in the brake booster with the predetermined magnitude; and said comparing means including means for determining the pressure in the brake booster being greater than the predetermined magnitude.

24. The apparatus as set forth in claim 23, wherein said second calculating means calculates the correction value based on the engine speed.

25. The apparatus as set forth in claim 18, wherein said air intake passage has a diverged passage and wherein said valve includes an idle speed control valve.

* * * * *